US011838512B2

(12) United States Patent
Choi et al.

(10) Patent No.: US 11,838,512 B2
(45) Date of Patent: Dec. 5, 2023

(54) METHOD OF DETERMINING TRANSFORM COEFFICIENT SCAN ORDER BASED ON HIGH FREQUENCY ZEROING AND APPARATUS THEREOF

(71) Applicant: LG ELECTRONICS INC., Seoul (KR)

(72) Inventors: Jungah Choi, Seoul (KR); Seunghwan Kim, Seoul (KR); Jin Heo, Seoul (KR); Sunmi Yoo, Seoul (KR); Ling Li, Seoul (KR); Jangwon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 281 days.

(21) Appl. No.: 16/855,785

(22) Filed: Apr. 22, 2020

(65) Prior Publication Data

US 2020/0252615 A1    Aug. 6, 2020

Related U.S. Application Data

(63) Continuation of application No. PCT/KR2019/017723, filed on Dec. 13, 2019.

(Continued)

(51) Int. Cl.
*H04N 19/129* (2014.01)
*H04N 19/132* (2014.01)
(Continued)

(52) U.S. Cl.
CPC ......... *H04N 19/132* (2014.11); *H04N 19/129* (2014.11); *H04N 19/176* (2014.11); *H04N 19/46* (2014.11); *H04N 19/60* (2014.11)

(58) Field of Classification Search
CPC .... H04N 19/132; H04N 19/60; H04N 19/176; H04N 19/46; H04N 19/129
See application file for complete search history.

(56) References Cited

U.S. PATENT DOCUMENTS 5,699,117 A * 12/1997 Uramoto ............... H04N 19/61
348/390.1
8,902,988 B2 * 12/2014 Sole Rojals ........... H04N 19/13
375/240.18

(Continued)

FOREIGN PATENT DOCUMENTS

CN    102210151 A    10/2011
CN    103370939 A    10/2013
(Continued)

OTHER PUBLICATIONS

Zhao at al., "CE6: Block size dependent zero-out transform (Test 1.14)", Meeting Report of the 11th meeting of the Joint Video Experts Team (JVET), Ljubljana, SI, Jul. 10-18, 2018, No. M43005, Retrieved from the Internet: URL:http://phenix.int-evry.frimpeg/doc_end_user/documents/123_Ljubljana/wg11/m43005-JVET-K0083-v1-JVET-K0083.zip JVET-K0083.docx [retrieved on Jul. 3, 2018].

(Continued)

*Primary Examiner* — Shawn S An
(74) *Attorney, Agent, or Firm* — Bryan Cave Leighton Paisner LLP

(57) ABSTRACT

An image decoding method performed by a decoding apparatus according to the present disclosure includes receiving a bitstream including residual information; deriving quantized transform coefficients for a current block based on the residual information included in the bitstream; deriving transform coefficients for the current block from the quantized transform coefficients based on an inverse quantization process; deriving residual samples for the current block by applying inverse transform to the derived transform coeffi- (Continued)

cients; and generating a reconstructed picture based on the residual samples for the current block.

10 Claims, 15 Drawing Sheets

Related U.S. Application Data

(60) Provisional application No. 62/780,925, filed on Dec. 17, 2018, provisional application No. 62/792,826, filed on Jan. 15, 2019.

(51) Int. Cl.
*H04N 19/176* (2014.01)
*H04N 19/46* (2014.01)
*H04N 19/60* (2014.01)

(56) References Cited

U.S. PATENT DOCUMENTS

| | | | | |
|---|---|---|---|---|
| 9,167,253 | B2* | 10/2015 | Sole Rojals | H04N 19/196 |
| 2009/0074052 | A1* | 3/2009 | Fukuhara | H04N 19/152 |
| | | | | 375/240.01 |
| 2011/0211636 | A1 | 9/2011 | Yamada et al. | |
| 2012/0140813 | A1* | 6/2012 | Sole Rojals | H04N 19/14 |
| | | | | 375/E7.126 |
| 2012/0140822 | A1 | 6/2012 | Wang et al. | |
| 2013/0058407 | A1* | 3/2013 | Sole Rojals | H04N 19/129 |
| | | | | 375/240.12 |
| 2013/0114676 | A1* | 5/2013 | Guo | H03M 7/4018 |
| | | | | 375/240.02 |
| 2014/0105284 | A1* | 4/2014 | Lim | H04N 19/46 |
| | | | | 375/240.03 |
| 2014/0334539 | A1* | 11/2014 | Kim | H04N 19/61 |
| | | | | 375/240.03 |
| 2015/0264403 | A1* | 9/2015 | Chong | H04N 19/176 |
| | | | | 375/240.18 |
| 2016/0309149 | A1* | 10/2016 | Thirumalai | H04N 19/129 |
| 2018/0035116 | A1* | 2/2018 | Chen | H04N 19/196 |
| 2019/0281217 | A1* | 9/2019 | Kim | H04N 19/13 |
| 2020/0021845 | A1* | 1/2020 | Lin | H04N 19/167 |
| 2020/0036977 | A1* | 1/2020 | Kumakura | H04N 19/157 |
| 2020/0045316 | A1* | 2/2020 | Leleannec | H04N 19/13 |
| 2020/0059650 | A1* | 2/2020 | Lu | H04N 19/136 |
| 2020/0092555 | A1* | 3/2020 | Zhao | H04N 19/122 |
| 2020/0236403 | A1* | 7/2020 | Choi | H04N 19/176 |

FOREIGN PATENT DOCUMENTS

| | | | |
|---|---|---|---|
| CN | 104378637 | A | 2/2015 |
| CN | 105611292 | A | 5/2016 |
| CN | 108712649 | A | 10/2018 |
| KR | 10-2011-0046016 | A | 5/2011 |
| KR | 10-2013-0095289 | A | 8/2013 |
| KR | 10-1743665 | B1 | 6/2017 |
| KR | 10-2018-0048739 | A | 5/2018 |
| WO | 2018190594 | A1 | 10/2018 |

OTHER PUBLICATIONS

Chen et al., "JVET-G1001: Algorithm description of Joint Exploration Test Model 7 (JEM7)", Meeting Report of the 7th meeting of the Joint Video Exploration Team (JVET), Torino, IT, Jul. 13-21, 2017, No. N17055, Retrieved from the Internet: URL:http://phenix.int-evry.frimpeg/doc_end_user/documents/119_Torino/wg11/w17055.zip w17055.docx [retrieved on Oct. 6, 2017].
Sullivan et al., "Overview of the High Efficiency Video Coding (HEVC) Standard", IEEE Transactions on Circuits and Systems for Video Technology, vol. 22, No. 12, Dec. 2012, pp. 1649-1668.
Office Action of Japanese Patent Office in Appl'n No. 2020-526132, dated Jun. 29, 2021.
Office Action of Korean Patent Office in Appl'n No. 10-2020-7011528, dated Jul. 1, 2021.
Recommendation_ITU-T_H.265: Series H: Audiovisual and Multimedia systems: Infrastructure of audiovisual services—Coding of moving video, High efficiency video coding, Jun. 29, 2021, (2 Pages).
XP011486338: Sole et al., "Transform Coefficient Coding in HEVC," IEEE Transactions on Circuits and Systems for Video Technology, vol. 22, No. 12, Dec. 2012, pp. 1765-1777.
Recommendation ITU-T H.265 (Apr. 2013) p. 51, 177 (4 pages) Series H: Audiovisual and Multimedia Systems, Infrastructure of audiovisual services—Coding of Moving, High Efficiency Video Coding, (Apr. 2013) (4 Pages).
Moonmo Koo et al., "CE6-related: Complexity reduction method based on skipping high frequency coefficients for inter MTS" 12th Meeting, Macao, CN Oct. 3-12, 2018, JVET-L0149, Oct. 7, 2018 (version 4) ( 244 Pages).

* cited by examiner

METHOD OF DETERMINING TRANSFORM COEFFICIENT SCAN ORDER BASED ON HIGH FREQUENCY ZEROING AND APPARATUS THEREOF

CROSS-REFERENCE TO RELATED APPLICATIONS

Pursuant to 35 U.S.C. § 119(e), this application is a continuation of International Application PCT/KR2019/017723, with an international filing date of Dec. 13, 2019, which claims the benefit of U.S. Provisional Application Nos. 62/780,925 filed on Dec. 17, 2018, and 62/792,826 filed on Jan. 15, 2019, the contents of which are all hereby incorporated by reference herein in their entirety.

BACKGROUND OF THE DISCLOSURE

Field of the Disclosure

The present disclosure relates to an image coding technique, and more particularly, to a method of determining a transform coefficient scan order based on high frequency zeroing in an image coding system, and an apparatus thereof.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

A technical problem to be addressed by the present disclosure lies in providing a method and an apparatus which increase image coding efficiency.

Another technical problem to be addressed by the present disclosure lies in providing a method and an apparatus which increase efficiency of residual coding.

Still another technical problem to be addressed by the present disclosure lies in providing a method and an apparatus which increase efficiency of transform coefficient level coding.

Still another technical problem to be addressed by the present disclosure lies in providing a method and an apparatus which increase residual coding efficiency by coding a transform coefficient based on high frequency zeroing.

Still another technical problem to be addressed by the present disclosure lies in providing a method of changing a method of scanning a transform coefficient group based on information about a region in a current block, to which high frequency zeroing is not applied when transform coefficients for the current block (or current transform block) are coded based on the high frequency zeroing, and an apparatus thereof.

Still another technical problem to be addressed by the present disclosure lies in providing a method of omitting a transform coefficient scan for a transform coefficient group related to a region to which high frequency zeroing is applied, and omitting signaling of a coded subblock flag for the transform coefficient group, and an apparatus thereof.

According to an embodiment of the present disclosure, there is provided an image decoding method which is performed by a decoding apparatus. The method includes receiving a bitstream including residual information; deriving quantized transform coefficients for a current block based on the residual information included in the bitstream; deriving transform coefficients for the current block from the quantized transform coefficients based on an inverse quantization process; deriving residual samples for the current block by applying inverse transform to the derived transform coefficients; and generating a reconstructed picture based on the residual samples for the current block, wherein each of the transform coefficients for the current block is related to a high frequency transform coefficient region consisting of transform coefficient 0, or a low frequency transform coefficient region including at least one significant transform coefficient, and a transform coefficient scanning is performed on transform coefficients related to the low frequency transform coefficient region among transform coefficients for the current block.

According to another embodiment of the present disclosure, there is provided a decoding apparatus for performing image decoding. The decoding apparatus includes an entropy decoder which receives a bitstream including residual information, and derives quantized transform coefficients for a current block based on the residual information included in the bitstream; a dequantizer which derives transform coefficients for the current block from the quantized transform coefficients based on an inverse quantization process; an inverse transformer which derives residual samples for the current block by applying inverse transform to the derived transform coefficients; and an adder which generates a reconstructed picture based on the residual samples for the current block, wherein each of the transform coefficients for the current block is related to a high frequency transform coefficient region consisting of transform coefficient 0, or a low frequency transform coefficient region including at least one significant transform coefficient, and a transform coefficient scanning is performed on transform coefficients related to the low frequency transform coefficient region among transform coefficients for the current block.

According to still another embodiment of the disclosure, there is provided an image encoding method which is performed by an encoding apparatus. The method includes deriving residual samples for a current block; deriving transform coefficients for the current block by transforming the residual samples for the current block; deriving quantized transform coefficients from the transform coefficients based on a quantization process; and encoding residual information including information on the quantized transform coefficients, wherein each of the transform coefficients for the current block is related to a high frequency transform coefficient region consisting of transform coefficient 0, or a low frequency transform coefficient region including at least one significant transform coefficient, and a transform coefficient scanning is performed on transform coefficients related to the low frequency transform coefficient region among transform coefficients for the current block.

According to still another embodiment of the present disclosure, there is provided an encoding apparatus for performing image encoding. The encoding apparatus includes a subtractor which derives residual samples for a current block; a transformer which derives transform coefficients for the current block by transforming the residual samples for the current block; a quantizer which derives quantized transform coefficients from the transform coefficients based on a quantization process; and an entropy encoder which encodes residual information including information on the quantized transform coefficients, wherein each of the transform coefficients for the current block is related to a high frequency transform coefficient region consisting of transform coefficient 0, or a low frequency transform coefficient region including at least one significant transform coefficient, and a transform coefficient scanning is performed on transform coefficients related to the low frequency transform coefficient region among transform coefficients for the current block.

According to still another embodiment of the present disclosure, there is provided a decoder-readable storage medium which stores information on instructions which cause a video decoding apparatus to perform decoding methods according to some embodiments.

According to still another embodiment of the present disclosure, there is provided a decoder-readable storage medium which stores information on instructions which cause a video decoding apparatus to perform a decoding method according to an embodiment. The decoding method according to the embodiment includes receiving a bitstream including residual information; deriving quantized transform coefficients for a current block based on the residual information included in the bitstream; deriving transform coefficients for the current block from the quantized transform coefficients based on an inverse quantization process; deriving residual samples for the current block by applying inverse transform to the derived transform coefficients; and generating a reconstructed picture based on the residual samples for the current block, wherein each of the transform coefficients for the current block is related to a high frequency transform coefficient region consisting of transform coefficient 0, or a low frequency transform coefficient region including at least one significant transform coefficient, and a transform coefficient scanning is performed on transform coefficients related to the low frequency transform coefficient region among transform coefficients for the current block.

According to the present disclosure, it is possible to increase overall image/video compression efficiency.

According to the present disclosure, it is possible to increase efficiency of residual coding.

According to the present disclosure, it is possible to increase efficiency of transform coefficient level coding.

According to the present disclosure, it is possible to increase residual coding efficiency by coding a transform coefficient based on high frequency zeroing.

According to the present disclosure, it is possible to increase image coding efficiency by coding position information of a last significant transform coefficient in a current block (or current transform block) based on high frequency zeroing.

According to the present disclosure, it is possible to improve the throughput of CABAC by reducing the number of context-coded bins, and to perform coding more efficiently by performing binarization on a syntax element based on the size of the high frequency zeroing region (more correctly, a region to which the high frequency zeroing is not applied) when the high frequency zeroing is applied.

According to the present disclosure, it is possible to increase the image coding efficiency by scanning a transform coefficient group based on information about a region in a current block, to which high frequency zeroing is not applied when transform coefficients for the current block (or current transform block) are coded based on the high frequency zeroing.

According to the present disclosure, it is possible to increase the image coding efficiency by omitting a transform coefficient scan for a transform coefficient group related to a region to which high frequency zeroing is applied, and omitting signaling of a coded subblock flag for the transform coefficient group.

DESCRIPTION OF EXEMPLARY EMBODIMENTS

Figure 1:
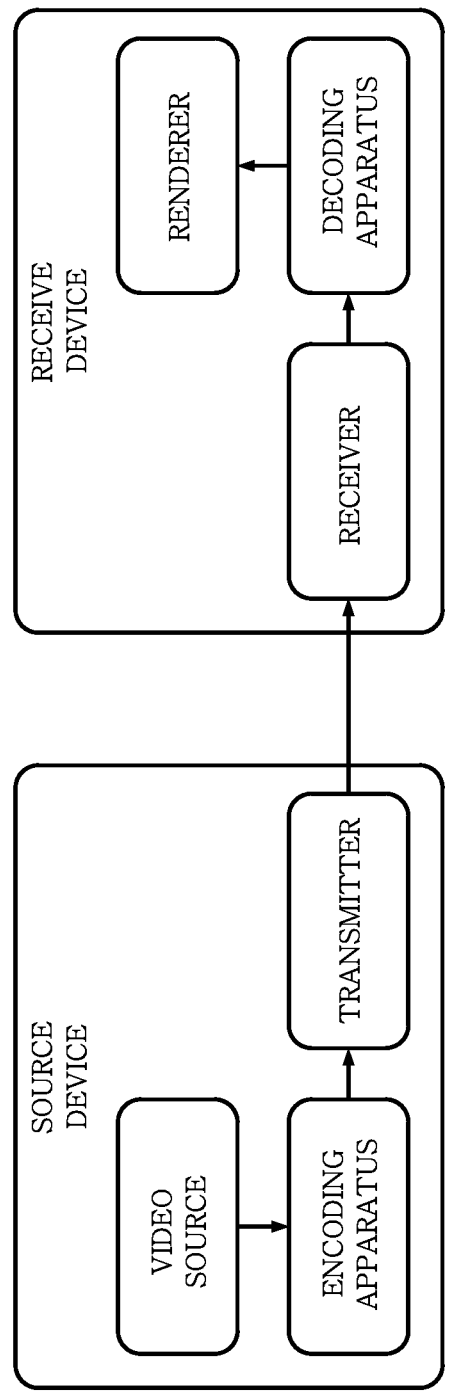
FIG. 1 schematically represents an example of a video/image coding system to which the present disclosure may be applied.

According to an embodiment of the present disclosure, there is provided an image decoding method which is performed by a decoding apparatus. The method includes receiving a bitstream including residual information; deriving quantized transform coefficients for a current block based on the residual information included in the bitstream; deriving transform coefficients for the current block from the quantized transform coefficients based on an inverse quantization process; deriving residual samples for the current block by applying inverse transform to the derived transform coefficients; and generating a reconstructed picture based on the residual samples for the current block, wherein each of the transform coefficients for the current block is related to a high frequency transform coefficient region consisting of transform coefficient 0, or a low frequency transform coefficient region including at least one significant transform coefficient, and a transform coefficient scanning is performed on transform coefficients related to the low frequency transform coefficient region among transform coefficients for the current block.

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is just for the purpose of describing specific embodiments, and is not used with intent to limit technical idea of the present disclosure. The singular forms may include the plural forms unless the context clearly indicates otherwise. The terms such as "comprise", "include", and the like are intended to indicate that features, numbers, steps, operations, elements, components, or combinations thereof written in the following description exist, and thus should not be understood as that the possibility of existence or addition of one or more different features, numbers, steps, operations, elements, components, or combinations thereof is excluded in advance.

Meanwhile, respective configurations on the drawings described in the present disclosure are independently described for convenience of description as to characteristic functions different from each other, but do not mean that the configurations are embodied by separate hardware or software. For example, two or more configurations may be combined to form a single configuration, and one configuration may be divided into plural configurations. The embodiment having each component formed by the integration and/or the dividing will fall into the scope of the patent right of the present disclosure as long as it does not depart from the essence of the present disclosure.

Hereinafter, preferred embodiments of the present disclosure will be explained in more detail, referring to the attached drawings. Hereinafter, the same reference signs are used for the same components on the drawings, and repeated descriptions for the same components may be omitted.

FIG. 1 illustrates an example of a video/image coding system to which the present disclosure may be applied.

This document relates to video/image coding. For example, a method/embodiment disclosed in this document may be applied to a method disclosed in versatile video coding (VVC) standard, essential video coding (EVC) standard, AOMedia Video 1 (AV1) standard, 2nd generation of audio video coding standard (AVS2) or next generation video/image coding standard (e.g., H.267, H.268, or the like).

In this document, a variety of embodiments relating to video/image coding may be provided, and, unless specified to the contrary, the embodiments may be combined to each other and be performed.

In this document, a video may refer to a series of images over time. A picture generally refers to the unit representing one image at a particular time frame, and a slice/tile refers to the unit constituting the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specified sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. In this document, a tile group and a slice may be used interchangeably. For example, in this document, a tile group/tile group header may also be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Referring to FIG. 1, a video/image coding system may include a first apparatus (source device) and a second apparatus (reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
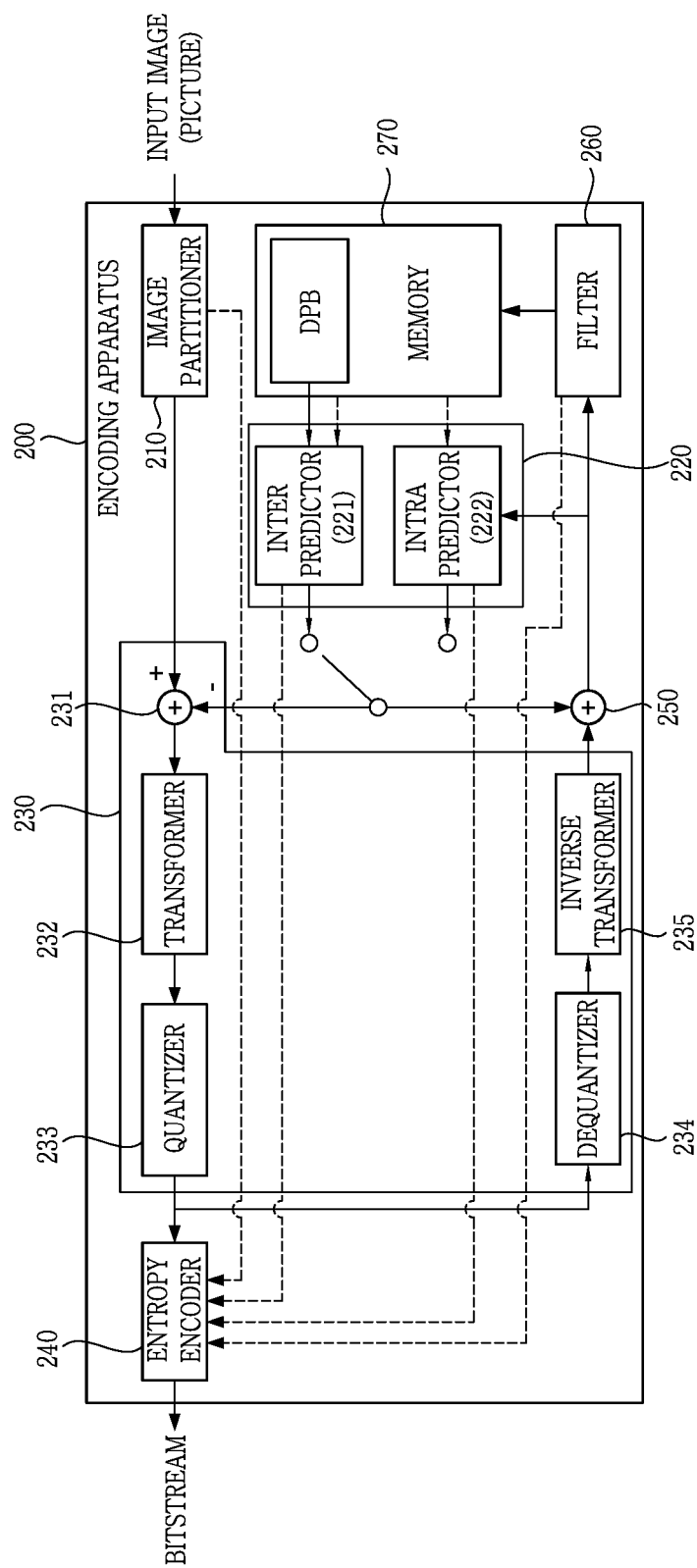
FIG. 2 is a diagram schematically describing a configuration of a video/image encoding apparatus to which the present disclosure may be applied.

FIG. 2 illustrates a structure of a video/image encoding apparatus to which the present disclosure may be applied. In what follows, a video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-Loève Transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
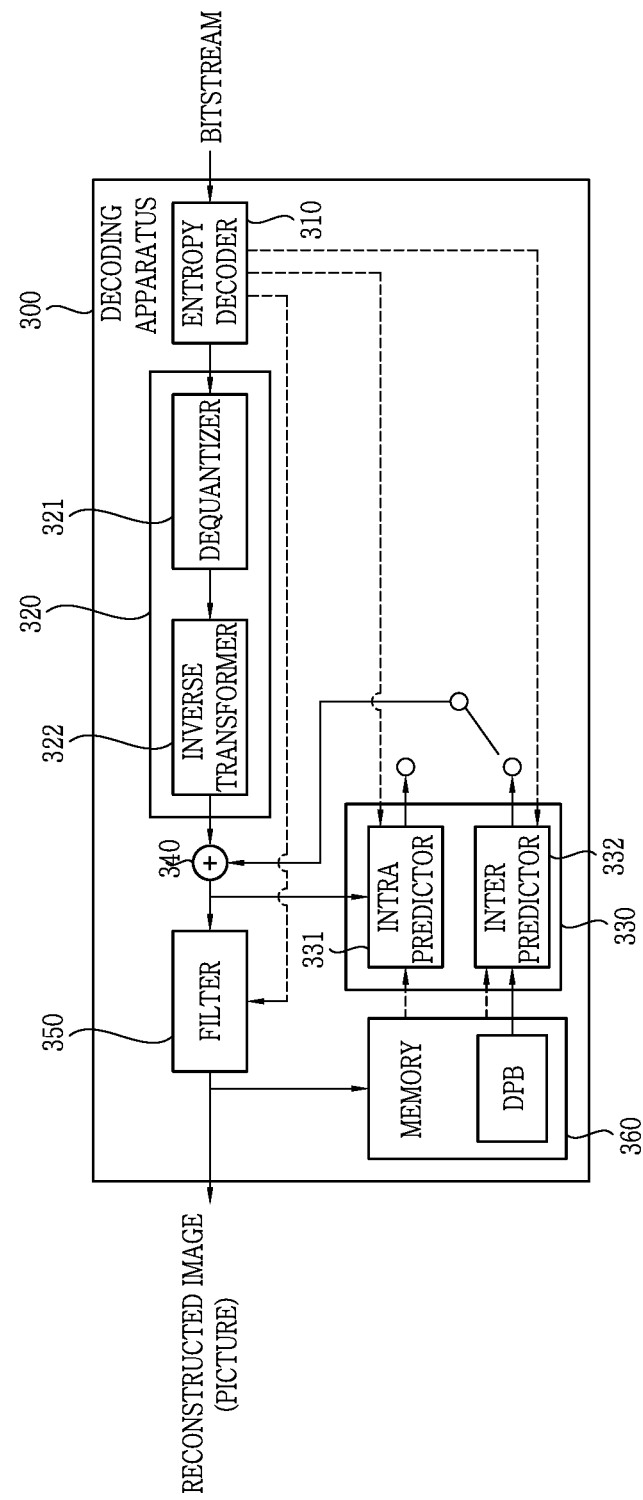
FIG. 3 is a diagram schematically describing a configuration of a video/image decoding apparatus to which the present disclosure may be applied.

FIG. 3 illustrates a structure of a video/image decoding apparatus to which the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be derived identically in the encoding apparatus and the decoding apparatus, and the encoding apparatus may signal to the decoding apparatus not original sample value of an original block itself but information on residual (residual information) between the original block and the predicted block, by which it is possible to increase the image coding efficiency. The decoding apparatus may derive a residual block including residual samples based on the residual information, generate a reconstructed block including reconstruction samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a dequantization/inverse transform procedure and derive the residual samples (or residual sample block), based on residual information. The decoding apparatus may generate a reconstructed picture based on a predicted block and the residual block. The encoding apparatus may derive a residual block by dequantizing/inverse transforming quantized transform coefficients for reference for inter prediction of a next picture, and may generate a reconstructed picture based on this.

Figure 4:
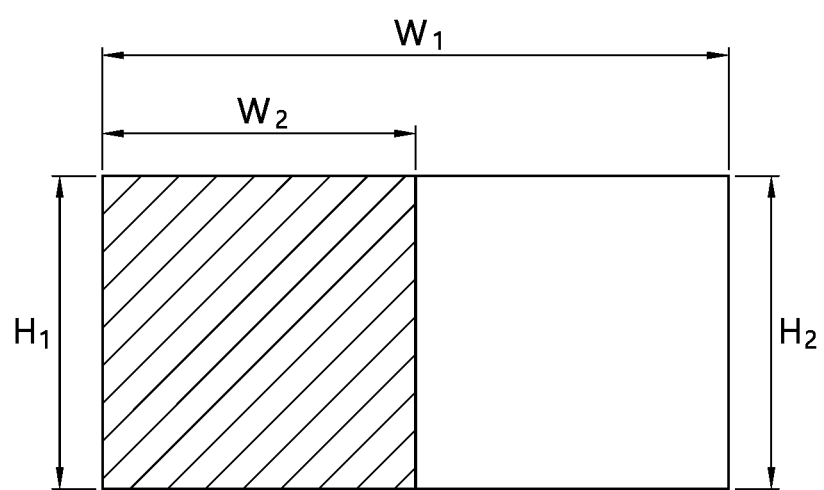
FIG. 4 is a drawing for explaining high frequency zeroing according to an embodiment.

FIG. 4 is a drawing for explaining high frequency zeroing according to an embodiment.

In the present specification, "high frequency zeroing" means a process of zeroing (i.e., being determined to be 0) transform coefficients related to a frequency equal to or higher than a certain value in a (transform) block having a first horizontal size (or length) W1 and a first vertical size (or length) H1. When high frequency zeroing is applied, the transform coefficient values of the transform coefficients outside a low frequency transform coefficient region constructed based on a second horizontal size W2 and a second vertical size H2 among transform coefficients in the (transform) block may be all determined (set) to be zero. The outside of the low frequency transform coefficient region may be referred to as a high frequency transform coefficient region. In an example, the low frequency transform coefficient region may be a region of a quadrangular shape located from a top-left end of the (transform) block.

In the present specification, a specific term or sentence is used for defining a specific information or concept. For example, in the present specification, as described above, the process of zeroing transform coefficients related to a frequency equal to or higher than a certain value in the (transform) block having the first horizontal size (or length) W1 and the first vertical size (or length) H1 is defined as "high frequency zeroing"; a region on which zeroing has been performed through the high frequency zeroing, as a "high frequency transform coefficient region"; and a region on which the zeroing is not performed, as a "low frequency transform coefficient region". To represent sizes of the low frequency transform coefficient region, the second horizontal size (or length) W2 and the second vertical size (or length) H2 are used.

However, the term "high frequency zeroing" may be replaced by various terms such as highfrequency zeroing, highfrequency zeroing, a high frequency zero-out or the like; the term "high frequency transform coefficient region", by various terms such as a high frequency zeroing applied region, a high frequency region, a high frequency coefficient region, or the like; and the term "low frequency transform coefficient region", by various terms such as a high frequency zeroing non-applied region, a low frequency region, a low frequency coefficient region, a restricted region, or the like. So, in the present specification, when interpreting throughout the specification a specific term or sentence used for defining a specific information or concept, it is necessary to pay attention to various operations, functions and effects according to contents which the term is intended to represent rather being limited to its name.

In an embodiment, there may be proposed a method of performing binarization of syntax elements, last_sig_coeff_x_prefix and last_sig_coeff_y_prefix, for a (transform) block (TB, TU or CB) to which the high frequency zeroing is applied. last_sig_coeff_x_prefix and last_sig_coeff_y_prefix may be binarized with a truncated Rice code, and at this time, a value of cRiceParam may use 0. A value of cMax used in binarization for the truncated Rice code may be determined based on Equation 1 when performing the binarization of last_sig_coeff_x_prefix, and be determined based on Equation 2 when performing the binarization of last_sig_coeff_y_prefix.

$$cMax = (\log_2 W_1 << 1) - 1 \qquad \text{[Equation 1]}$$

$$cMax = (\log_2 H_1 << 1) - 1 \qquad \text{[Equation 2]}$$

where W1 may represent the horizontal length (or width) of the (transform) block, and H1 may represent the vertical length (or height) of the (transform) block. For example, in the case of a 64×32 transform block as in FIG. 6, W1 is 64, and H1 is 32. Therefore, the value of cMax for binarization of last_sig_coeff_x_prefix may be 11, and the value of cMax for binarization of last_sig_coeff_y_prefix may be 9.

Table 1 below represents binarization when W1 or H1 is 32, and Table 2 below represents binarization codeword when W1 or H1 is 64. In an embodiment, the truncated Rice code binarization may be performed based on a size of the transform block, and thus, as in Table 2 below, the codeword of last_sig_coeff_x_prefix or last_sig_coeff_y_prefix for coding a case where the value of LastSignificantCoeffX or LastSignificantCoeffY is 32 to 47 may be '11111111110', and the codeword of last_sig_coeff_x_prefix or last_sig_coeff_y_prefix for coding a case where the value of LastSignificantCoeffX or LastSignificantCoeffY is 48 to 63 may be '11111111111'. The both cases may be binarized based on 11 bins. The codeword may be called a bin string.

TABLE 1

| LastSignificantCoeffX or LastSignificantCoeffY | codeword | length of the codeword |
|---|---|---|
| 0 | 0 | 1 |
| 1 | 10 | 2 |
| 2 | 110 | 3 |
| 3 | 1110 | 4 |
| 4, 5 | 11110 | 5 |
| 6, 7 | 111110 | 6 |
| 8~11 | 1111110 | 7 |

TABLE 1-continued

| LastSignificantCoeffX or LastSignificantCoeffY | codeword | length of the codeword |
|---|---|---|
| 12~15 | 11111110 | 8 |
| 16~23 | 111111110 | 9 |
| 24~31 | 111111111 | 9 |

TABLE 2

| LastSignificantCoeffX or LastSignificantCoeffY | codeword | length of the codeword |
|---|---|---|
| 0 | 0 | 1 |
| 1 | 10 | 2 |
| 2 | 110 | 3 |
| 3 | 1110 | 4 |
| 4, 5 | 11110 | 5 |
| 6, 7 | 111110 | 6 |

TABLE 2-continued

| LastSignificantCoeffX or LastSignificantCoeffY | codeword | length of the codeword |
|---|---|---|
| 8~11 | 1111110 | 7 |
| 12~15 | 11111110 | 8 |
| 16~23 | 111111110 | 9 |
| 24~31 | 1111111110 | 10 |
| 32~47 | 11111111110 | 11 |
| 48~63 | 11111111111 | 11 |

Meanwhile, the encoding apparatus (entropy encoder) according to an embodiment may perform a residual coding procedure on (quantized) transform coefficients. In an example, the encoding apparatus may perform residual coding on (quantized) transform coefficients in the current block (current coding block (CB) or current transform block (TB)) according to a scan order. At this time, the encoding apparatus, for example, may generate and encode various syntax elements related to residual information as written in Table 3 below.

TABLE 3

| | Descriptor |
|---|---|
| residual_coding( x0, y0, log2TbWidth, log2TbHeight, cIdx ) { | |
| if( transform_skip_enabled_flag && | |
| ( cIdx != 0 \| cu_mts_flag[ x0 ][ y0 ] == 0 ) && | |
| ( log2TbWidth <= 2 ) && ( log2TbHeight <= 2 ) ) | |
| transform_skip_flag[ x0 ][ y0 ][ cIdx ] | ae(v) |
| last_sig_coeff_x_prefix | ae(v) |
| last_sig_coeff_y_prefix | ae(v) |
| if( last_sig_coeff_x_prefix > 3 ) | |
| last_sig_coeff_x_suffix | ae(v) |
| if( last_sig_coeff_y_prefix > 3 ) | |
| last_sig_coeff_y_suffix | ae(v) |
| log2SbSize = ( Min( log2TbWidth, log2TbHeight ) < 2 ? 1 : 2 ) | |
| numSbCoeff = 1 << ( log2SbSize << 1 ) | |
| laxtScanPos = numSbCoeff | |
| lastSubBlock = ( 1 << ( | |
| log2TbWidth + log2TbHeight − 2 * log2SbSize ) ) −1 | |
| do { | |
| if( lastScanPos == 0 ) { | |
| lastScanPos = numSbCoeff | |
| lastSubBlock− − | |
| } | |
| lastScanPos− − | |
| xS = DiagScanOrder[ log2TbWidth − log2SbSize ][ log2TbHeight −log2SbSize ] [ lastSubBlock ][ 0 ] | |
| yS = DiagScanOrder[ log2TbWidth − log2SbSize ][ log2TbHeight −log2SbSize ] [ lastSubBlock ][ 1 ] | |
| xC = ( xS << log2SbSize ) + DiagScanOrder[ log2SbSize ][ log2SbSize ][ lastScanPos ][ 0 ] | |
| yC = ( yS << log2SbSize ) + DiagScanOrder[ log2SbSize ][ log2SbSize ][ lastScanPos ][ 1 ] | |
| } while( ( xC != LastSignificantCoeffX ) \| \| ( yC != LastSignificantCoeffY ) ) | |
| QState = 0 | |
| for( i = lastSubBlock; i >= 0; i− − ) { | |
| startQStateSb = QState | |
| xS = DiagScanOrder[ log2TbWidth − log2SbSize ][ log2TbHeight −log2SbSize ] [ lastSubBlock ][ 0 ] | |
| yS = DiagScanOrder[ log2TbWidth − log2SbSize ][ log2TbHeight −log2SbSize ] [ lastSubBlock ][ 1 ] | |
| inferSbDcSigCoeffFlag = 0 | |
| if( ( i < lastSubBlock ) && ( i > 0 ) ) { | |
| coded_sub_block_flag[ xS ][ yS ] | ae(v) |
| inferSbDcSigCoeffFlag = 1 | |
| } | |
| firstSigScanPosSb = numSbCoeff | |
| lastSigScanPosSb = −1 | |
| for( n = ( i == lastSubBlock ) ? lastScanPos − 1 : numSbCoeff −1; n >= | |

TABLE 3-continued

| | Descriptor |
|---|---|
| 0; n-- ) {<br>xC = ( xS << log2SbSize ) +<br>DiagScanOrder[ log2SbSize ][ log2SbSize ][ n ][ 0 ]<br>yC = ( yS << log2SbSize ) +<br>DiagScanOrder[ log2SbSize ][ log2SbSize ][ n ][ 1 ]<br>if( coded_sub_block_flag[ xS ][ yS ] && ( n > 0 \|\|<br>!inferSbDcSigCoeffFlag ) ) {<br>sig_coeff_flag[ xC ][ yC ] | ae(v) |
| }<br>if( sig_coeff_flag[ xC ][ yC ] ) {<br>par_level_flag[ n ]<br>rem_abs_gt1_flag[ n ]<br>if( lastSigScanPosSb = = -1 )<br>lastSigScanPosSb = n<br>firstSigScanPosSb = n<br>}<br>AbsLevelPass1[ xC ][ yC ] = sig_coeff_flag[ xC ][ yC ] +<br>par_level_flag[ n ] + 2 * rem_abs_gt1_flag[ n ]<br>if( dep_quant_enabled_flag )<br>QState = QStateTransTable[ QState ][ par_level_flag[ n ] ]<br>}<br>for( n = numSbCoeff - 1; n >= 0; n-- ) {<br>if( rem_abs_gt1_flag[ n ] )<br>rem_abs_gt2_flag[ n ] | ae(v)<br>ae(v)<br><br><br><br><br><br><br><br><br><br><br><br><br>ae(v) |
| }<br>for( n = numSbCoeff - 1; n >= 0; n-- ) {<br>xC = ( xS << log2SbSize ) +<br>DiagScanOrder[ log2SbSize ][ log2SbSize ][ n ][ 0 ]<br>yC = ( yS << log2SbSize ) +<br>DiagScanOrder[ log2SbSize ][ log2SbSize ][ n ][ 1 ]<br>if( rem_abs_gt2_flag[ n ] )<br>abs_remainder[ n ]<br>AbsLevel[ xC ][ yC ] = AbsLevelPass1[ xC ][ yC ]+ 2 * (<br>rem_abs_gt2_flag[ n ] + abs_remainder[ n ] )<br>}<br>if( dep_quant_enabled_flag \|\| !sign_data_hiding_enabled_flag )<br>signHidden = 0<br>else<br>signHidden = ( lastSigScanPosSb - firstSigScanPosSb > 3 ? 1 : 0 )<br>for( n = numSbCoeff - 1; n >= 0; n-- ) {<br>xC = ( xS << log2SbSize ) +<br>DiagScanOrder[ log2SbSize ][ log2SbSize ][ n ][ 0 ]<br>yC = ( yS << log2SbSize ) +<br>DiagScanOrder[ log2SbSize ][ log2SbSize ][ n ][ 1 ]<br>if( sig_coeff_flag[ xC ][ yC ] && ( !signHidden \|\| ( n !=<br>firstSigScanPosSb ) ) )<br>coeff_sign_flag[ n ] | ae(v) |
| }<br>if( dep_quant_enabled_flag ) {<br>QState = startQStateSb<br>for( n = numSbCoeff - 1; n >= 0; n--) {<br>xC = ( xS << log2SbSize ) +<br>DiagScanOrder[ log2SbSize ][ log2SbSize ][ n ][ 0 ]<br>yC = ( yS << log2SbSize ) +<br>DiagScanOrder[ log2SbSize ][ log2SbSize ][ n ][ 1 ]<br>if( sig_coeff_flag[ xC ][ yC ] )<br>TransCoeffLevel[ x0 ][ y0 ][ cIdx ][ xC ][ yC ] = ( 2 *<br>AbsLevel[ xC ][ yC ] - ( QState > 1 1 : 0 ) ) * ( 1 - 2 *<br>coeff_sign_flag[ n ] )<br>QState = QStateTransTable[ QState ][ par_level_flag[ n ] ]<br>} else {<br>sumAbsLevel = 0<br>for( n = numSbCoeff - 1; n >= 0; n--)<br>xC = ( xS << log2SbSize ) +<br>DiagScanOrder[ log2SbSize ][ log2SbSize ][ n ][ 0 ]<br>yC = ( yS << log2SbSize ) +<br>DiagScanOrder[ log2SbSize ][ log2SbSize ][ n ][ 1 ]<br>if( sig_coeff_flag[ xC ][ yC ] ) {<br>TransCoeffLevel[ x0 ][ y0 ][ cIdx ][ xC ][ yC ] =<br>AbsLevel[ xC ][ yC ] * ( 1 - 2 * coeff_sign_flag[ n ] )<br>if( signHidden ) {<br>sumAbsLevel += AbsLevel[ xC ][ yC ]<br>if( ( n = = firstSigScanPosSb ) && ( sumAbsLevel % 2 ) = = 1 ) )<br>TransCoeffLevel[ x0 ][ y0 ][ cIdx ][ xC ][ yC ] =<br>-TransCoeffLevel[ x0 ][ y0 ][ cIdx ][ xC ][ yC ]<br>}<br>}<br>} | |

TABLE 3-continued

|  | Descriptor |
|---|---|
| ```
}
}
if( cu_mts_flag[ x0 ][ y0 ] && ( cIdx = = 0 ) &&
!transform_skip_flag[ x0 ][ y0 ][ cIdx ] && (
( CuPredMode[ x0 ][ y0 ] = = MODE_INTRA && numSigCoe
ff > 2 ) | | ( CuPredMode[ x0 ][ y0 ] = = MODE_INTER )
) ) {
mts_idx[ x0 ][ y0 ]
}
residual_coding( x0, y0, log2TbWidth, log2TbHeight, cIdx ) {
if( transform_skip_enabled_flag &&
( cIdx ! = 0 | | cu_mts_flag[ x0 ][ y0 ] = = 0 ) &&
( log2TbWidth <= 2 ) && ( log2TbHeight <= 2 ) )
transform_skip_flag[ x0 ][ y0 ][ cIdx ]
last_sig_coeff_x_prefix
last_sig_coeff_y_prefix
if( last_sig_coeff_x_prefix > 3 )
last_sig_coeff_x_suffix
if( last_sig_coeff_y_prefix > 3 )
lat_sig_coeff_y_suffix
log2SbSize = ( Min( log2TbWidth, log2TbHeight ) < 2 ? 1 : 2 )
numSbCoeff = 1 << ( log2SbSize << 1 )
lastScanPos = numSbCoeff
lastSubBlock = ( 1 << (
log2TbWidth + log2TbHeight − 2 * log2SbSize ) ) −1
do {
if( lastScanPos = = 0 ) {
lastScanPos = numSbCoeff
lastSubBlock− −
}
lastScanPos− −
xS =
DiagScanOrder[ log2TbWidth − log2SbSize ][ log2TbHeight −log2SbSi
ze ] [ lastSubBlock ][ 0 ]
yS =
DiagScanOrder[ log2TbWidth − log2SbSize ][ log2TbHeight −log2SbSi
ze ] [ lastSubBlock ][ 1 ]
xC = ( xS << log2SbSize ) +
DiagScanOrder[ log2SbSize ][ log2SbSize ][ lastScanPos ][ 0 ]
yC = ( yS << log2SbSize ) +
DiagScanOrder[ log2SbSize ][ log2SbSize ][ lastScanPos ][ 1 ]
} while( ( xC != LastSignificantCoeffX ) | | (yC != LastSignificantCoeffY
) )
QState = 0
for( i = lastSubBlock; i >= 0; i− − ) {
startQStateSb = QState
xS =
DiagScanOrder[ log2TbWidth − log2SbSize ][ log2TbHeight −log2SbSi
ze ] [ lastSubBlock ][ 0 ]
yS =
DiagScanOrder[ log2TbWidth − log2SbSize ][ log2TbHeight −log2SbSi
ze ] [ lastSubBlock ][ 1 ]
inferSbDcSigCoeffFlag = 0
if( ( i < lastSubBlock ) && ( i > 0 ) ) {
coded_sub_block_flag[ xS ][ yS ]
inferSbDcSigCoeffFlag = 1
}
firstSigScanPosSb = numSbCoeff
lastSigScanPosSb = −1
for( n = ( i = = lastSubBlock ) ? lastScanPos − 1 : numSbCoeff −1; n >=
0; n−− ) {
xC = ( xS << log2SbSize ) +
DiagScanOrder[ log2SbSize ][ log2SbSize ][ n ][ 0 ]
yC = ( yS << log2SbSize ) +
DiagScanOrder[ log2SbSize ][ log2SbSize ][ n ][ 1 ]
if( coded_sub_block_flag[ xS ][ yS ] && ( n > 0 | |
!inferSbDcSigCoeffFlag ) ) {
sig_coeff_flag[ xC ][ yC ]
}
if( sig_coeff_flag[ xC ][ yC ] ) {
par_level_flag[ n ]
rem_abs_gt1_flag[ n ]
if( lastSigScanPosSb = = −1 )
lastSigScanPosSb = n
firstSigScanPosSb = n
}
AbsLevelPass1[ xC ][ yC ] = sig_coeff_flag[ xC ][ yC ] +
par_level_flag[ n ] + 2 * rem_abs_gt1_flag[ n ]
``` | <br><br><br><br><br><br><br>ae(v)<br><br><br><br><br><br>ae(v)<br>ae(v)<br>ae(v)<br><br>ae(v)<br><br>ae(v)<br><br><br><br><br><br><br><br><br><br><br><br><br><br><br><br><br><br><br><br><br><br><br><br><br><br><br><br><br><br><br><br><br><br><br>ae(v)<br><br><br><br><br><br><br><br><br><br>ae(v)<br><br><br>ae(v)<br>ae(v) |

TABLE 3-continued

Descriptor

```
if( dep_quant_enabled_flag )
QState = QStateTransTable[ QState ][ par_level_flag[ n ] ]
}
for( n = numSbCoeff − 1; n >= 0; n−− ) {
if( rem_abs_gt1_flag[ n ] )
rem_abs_gt2_flag[ n ]                                          ae(v)
}
for( n = numSbCoeff − 1; n >= 0; n−− ) {
xC = ( xS << log2SbSize ) +
DiagScanOrder[ log2SbSize ][ log2SbSize ][ n ][ 0 ]
yC = ( yS << log2SbSize ) +
DiagScanOrder[ log2SbSize ][ log2SbSize ][ n ][ 1 ]
if( rem_abs_gt2_flag[ n ] )
abs_remainder[ n ]
AbsLevel[ xC ][ yC ] = AbsLevelPass1[ xC ][ yC ] + 2 * (
rem_abs_gt2_flag[ n ] + aba_remainder[ n ] )
}
if( dep_quant_enabled_flag | | !sign_data_hiding_enabled_flag )
signHidden = 0
else
signHidden = ( lastSigScanPosSb − firstSigScanPosSb > 3 ? 1 : 0 )
for( n = numSbCoeff − 1; n >= 0; n−− ) {
xC = ( xS << log2SbSize ) +
DiagScanOrder[ log2SbSize ][ log2SbSize ][ n ][ 0 ]
yC = ( yS << log2SbSize ) +
DiagScanOrder[ log2SbSize ][ log2bbSize ][ n ][ 1 ]
if( sig_coeff_flag[ xC ][ yC ] && ( !signHidden | | ( n !=
firstSigScanPosSb ) ) )
coeff_sign_flag[ n ]                                           ae(v)
}
if( dep_quant_enabled_flag ) {
QState = startQStateSb
for( n = numSbCoeff − 1; n >= 0; n−−−− xC = ( xS << log2SbSize ) +
DiagScanOrder[ log2SbSize ][ log2SbSize ][ n ][ 0 ]
yC = ( yS << log2SbSize ) +
DiagScanOrder[ log2SbSize ][ log2SbSize ][ n ][ 1 ]
if( sig_coeff_flag[ xC ][ yC ] )
TransCoeffLevel[ x0 ][ y0 ][ cIdx ][ xC ][ yC ] = ( 2 *
AbsLevel[ xC ][ yC ] − ( QState > 1 1 : 0 ) ) * ( 1 − 2 *
coeff_sign_flag[ n ] )
QState = QStateTransTable[ QState ][ par_level_flag[ n ] ]
} else {
sumAbsLevel = 0
for( n = numSbCoeff − 1; n >= 0; n−−−
xC = ( xS << log2SbSize ) +
DiagScanOrder[ log2SbSize ][ log2SbSize ][ n ][ 0 ]
yC = ( yS << log2SbSize ) +
DiagScanOrder[ log2SbSize ][ log2SbSize ][ n ][ 1 ]
if( sig_coeff_flag[ xC ][ yC ] ) {
TransCoeffLevel[ x0 ][ y0 ][ cIdx ][ xC ][ yC ] =
AbsLevel[ xC ][ yC ] * ( 1 − 2 * coeff_sign_flag[ n ] )
if( signHidden ) {
sumAbsLevel += AbsLevel[ xC ][ yC ]
if( ( n = = firstSigScanPosSb ) && ( sumAbsLevel % 2 ) = = 1 ) )
TransCoeffLevel[ x0 ][ y0 ][ cIdx ][ xC ][ yC ] =
−TransCoeffLevel[ x0 ][ y0 ][ cIdx ][ xC ][ yC ]
}
}
}
}
}
if( cu_mts_flag[ x0 ][ y0 ] && ( cIdx = = 0 ) &&
!transform_skip_flag[ x0 ][ y0 ][ cIdx ] && (
( CuPredMode[ x0 ][ y0 ] = = MODE_INTRA && numSigCoe
ff > 2 ) | | ( CuPredMode[ x0 ][ y0 ] = = MODE_INTER )
) ) {
mts_idx[ x0 ][ y0 ]                                            ae(v)
}
```

As shown in Table 3 above, when the value of last_sig_coeff_x_prefix is greater than 3, last_sig_coeff_x_suffix may be further signaled, and LastSignificantCoeffX may be derived based on the value of last_sig_coeff_x_suffix. For example, the codeword of last_sig_coeff_x_prefix for coding a case where the value of LastSignificantCoeffX is 32 to 47 may be '11111111110', and which value among 32 to 47 will be used may be determined based on the value of last_sig_coeff_x_suffix. In addition, as shown in Table 1 above, when the value of last_sig_coeff_y_prefix is greater than 3, last_sig_coeff_y_suffix may be further signaled, and LastSignificantCoeffY may be derived based on the value of last_sig_coeff_y_suffix. For example, the codeword of last_sig_coeff_x_prefix for coding a case where the value of LastSignificantCoeffY is 32 to 47 may be '11111111110', and which value among 32 to 47 will be used may be determined based on the value of last_sig_coeff_y_suffix.

Specific calculation for deriving LastSignificantCoeffX or LastSignificantCoeffY, for example, may be performed as Table 4 below.

TABLE 4

The column position of the last significant coefficient in scanning order within a transform block LastSignificantCoeffX is derived as follows:
- If last_sig_coeff_x_suffix is not present, the following applies:
LastSignificantCoeffX = last_sig_coeff_x_prefix
- Otherwise (last_sig_coeff_x_suffix is present), the following applies:
LastSignificantCoeffX= (1<<((last_sig_coeff_x_prefix>>1)−1)) * (2+(last_sig_coeff_x_prefix&1)) + last_sig_coeff_x_suffix
The row position of the last significant coefficient in scanning order within a transform block LastSignificantCoeffY is derived as follows:
- If last_sig_coeff_y_suffix is not present, the following applies:
LastSignificantCoeffY = last_sigcoeff_y_prefix
- Otherwise (last_sig_coeff_y_suffix is present), the following applies:
LastSignificantCoeffY=(1<<((last_sig_coeff_y_prefix>>1)−1))* (2+(last_sig_coeff_y_prefix&1))+last_sig_coeff_y_suffix The high frequency zeroing means zeroing (i.e., determining as 0) coefficients of a frequency equal to or higher than a certain value in a transform block having a first horizontal size W1 or a first vertical size H1, and restricting a residual transform coefficient to a second horizontal size W2 or a second vertical size H2. At this time, in an embodiment, a method in which the binarization is performed based on a truncated Rice code based on a size (second horizontal size or second vertical size) of a restricted region derived through the high frequency zeroing may be considered, rather than a method in which binarization is performed based on a truncated Rice code based on a size (first horizontal size or first vertical size) of a transform block. After defining cMax for last_sig_coeff_x_prefix and cMax for last_sig_coeff_y_prefix as Equations 3 and 4 below, respectively, the truncated Rice code may be generated using the second horizontal size and the second vertical size.

$$cMax=(\log_2(\min(W_1,W_2))<<1)-1 \quad \text{[Equation 3]}$$

$$cMax=(\log_2(\min(H_1,H_2))<<1)-1 \quad \text{[Equation 4]}$$

In an example, when the first horizontal size or first vertical size is 64 and the second horizontal size or the second vertical size is 32, the truncated Rice code derived based on forgoing Equations 3 and 4 may be like Table 5 below. Through the high frequency zeroing, a residual transform coefficient is removed from high frequency coefficients in a high frequency transform coefficient region formed outside the second horizontal size or the second vertical size, so it is possible to design a binarization codeword as in Table 5 below.

In an embodiment, W2 and H2 may be set as a fixed value. Alternatively, W2 and H2 may be determined based on W1 and H1. Alternatively, information indicating W2 and H2 may be signaled from an encoding apparatus to a decoding apparatus. In an example, W2 and H2 may be set as 32 or 16, respectively. In another example, said W2 and H2 may be derived as a half of W1 and a half of H1, respectively. In still another example, said W2 and H2 may be derived as a half of max (W1, H1). However, these are examples, and said W2 and H2 may be determined by other various methods which are set in an encoding apparatus and a decoding apparatus. Through the proposed method, it is possible to effectively reduce the lengths of codewords for some values of LastSignificantCoeffX or LastSignificantCoeffY. Further, as the coded bin reduced through the proposed method is a context-coded bin, there may be an advantage in terms of a throughput.

TABLE 5

| LastSignificantCoeffX or LastSignificantCoeffY | codeword | length of the codeword |
|---|---|---|
| 0 | 0 | 1 |
| 1 | 10 | 2 |
| 2 | 110 | 3 |
| 3 | 1110 | 4 |
| 4, 5 | 11110 | 5 |
| 6, 7 | 111110 | 6 |
| 8~11 | 1111110 | 7 |
| 12~15 | 11111110 | 8 |
| 16~23 | 111111110 | 9 |
| 24~31 | 111111111 | 9 |
| 32~47 | N/A | N/A |
| 48~63 | N/A | N/A |

In an example, a residual coding method to be described later in FIGS. 7A to 8B may be performed based on the embodiments described in FIG. 4. In another example, an encoding method to be described later in FIG. 9 or a decoding method to be described later in FIG. 11 may be performed based on the examples described in FIG. 4.

Figure 5:
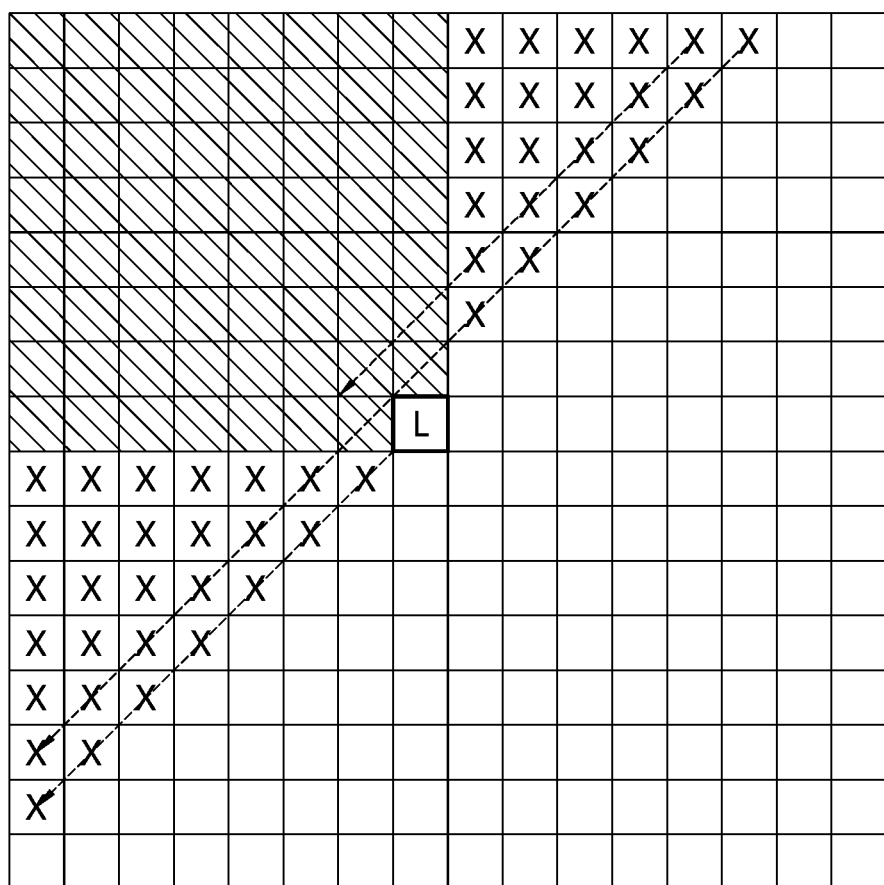
FIG. 5 is a drawing for describing an embodiment of a method of scanning transform coefficients for a current block to which high frequency zeroing has been applied.
Figure 6:
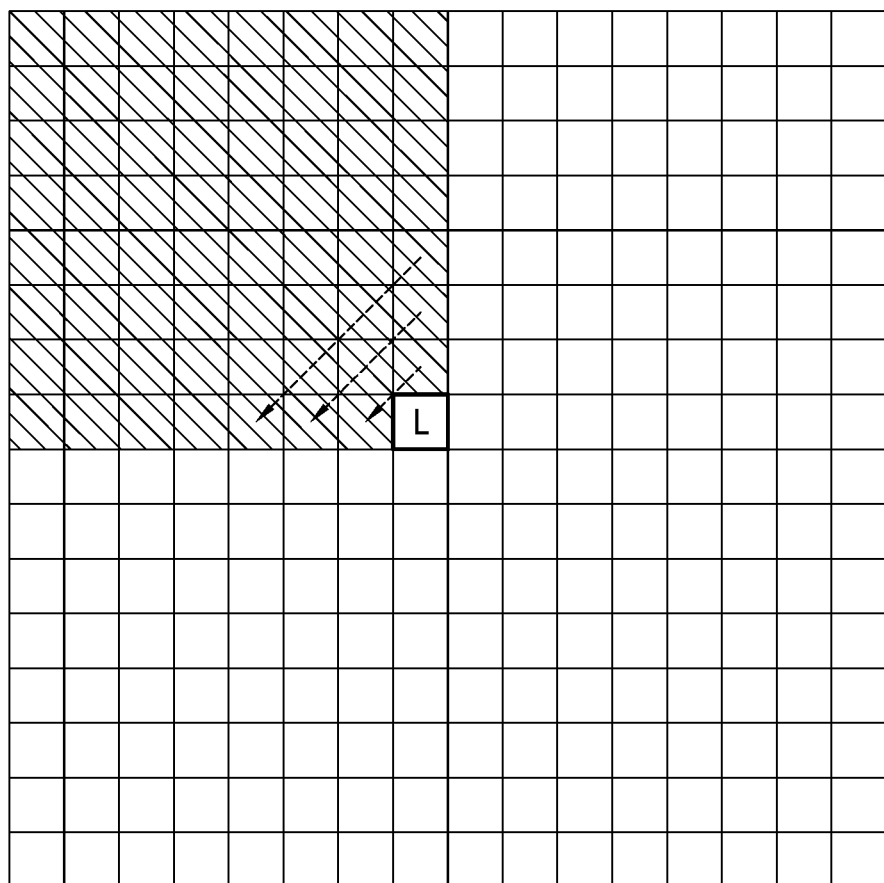
FIG. 6 is a drawing for describing another example of a method of scanning transform coefficients for a current block to which high frequency zeroing has been applied.

FIG. 5 is a drawing for describing an example of a method of scanning transform coefficients for a current block to which high frequency zeroing has been applied, and FIG. 6 is a drawing for describing another example of a method of scanning transform coefficients for a current block to which high frequency zeroing has been applied.

In an embodiment, residual coding may be performed, scanning a transform coefficient group in an inverse diagonal direction from a position of a last transform coefficient group in which a last non-zero coefficient is included. On the other hand, in addition to it, or alternatively to it, in another embodiment, a scan order of the transform coefficient group may be changed for the transform block to which the high frequency zeroing is applied.

FIG. 5 represents a method of scanning a 4×4 transform coefficient group in a 64×64 transform block to which the high frequency zeroing is applied. In FIG. 5, a portion denoted by L indicates the 4×4 transform coefficient group in which the last non-zero coefficient is included. The high frequency zeroing means zeroing (or zeroing out) transform coefficients related to a high frequency equal to or higher than a certain frequency in a transform block having a first horizontal size W1 and/or a first vertical size H1, and restricting a residual transform coefficient to a second horizontal size W2 and/or a second vertical size H2. 4×4 blocks marked with dots in FIG. 5 represent regions which are zeroed out through the high frequency zeroing. In FIG. 5, the hatched region may be referred to as the low frequency transform coefficient region, and the region marked with dots may be referred to as a high frequency transform coefficient region.

W2 and/or H2 may be set as a fixed value, or determined based on W1 and/or HE Alternatively, information indicating W2 and/or H2 may be signaled from an encoding apparatus to a decoding apparatus. In an example, each of said W2 and/or H2 may be set as 32 or 16. In another example, said W2 and/or H2 may be derived as a half of W1 and/or a half of H1, respectively. In still another example, said W2 and/or H2 may be derived as a half of max (W1, H1). However, the above-described examples are not all-inclusive, and said W2 and/or H2 may be determined based on various methods in an encoding apparatus and a decoding apparatus.

When using the transform coefficient group scan method according to FIG. 5, it may be confirmed that the region zeroed out through the high frequency zeroing should also be scanned according to an inverse diagonal scan order. In a case where an unnecessary block is scanned like this, the coding complexity may increase, and a burden of coding that a coded subblock flag (a flag, which represents whether transform coefficient levels of transform coefficients for a subblock in the current block are all 0, may be expressed, for example, as coded_sub_block_flag) is 0 in a zeroed-out region (a region constructed by 4×4 blocks marked with x in FIG. 5) subblock by subblock.

Therefore, when the high frequency zeroing is applied, a method in which the scan of transform coefficient group is restricted so as to be performed only within a size (a second horizontal size or a second vertical size) of a region which is restricted in high frequency zeroing (or a low frequency transform coefficient region) may be considered. In an embodiment, there is proposed a method of performing a transform coefficient group scan as in FIG. 6 instead of the transform coefficient group scan according to FIG. 5.

In a case where the transform coefficient group scan method according to FIG. 6 is performed, it is possible to omit the unnecessary scan process, and to prevent the coded subblock flag from being coded unnecessarily. That is, according to an embodiment of FIG. 6, the encoding apparatus may not incorporate into a residual coding syntax (or bitstream) the coded subblock flag for the subblock located at a region beyond W2 and/or H2 (i.e., a high frequency transform coefficient region) in the current (transform) block. That is, a bit for the syntax element, coded_sub_block_flag, for the subblock located at a region beyond W2 and/or H2 may not be assigned. In this case, the decoding apparatus may infer that the last significant coefficient is not located in a region beyond W2 and/or H2 without performing a scan on a subblock located at the region beyond the W2 and/or H2. Further, without parsing the syntax element, coded_sub_block_flag, for a subblock located at a region beyond W2 and/or H2 from a residual coding syntax (or bitstream), the decoding apparatus may infer that a value of the syntax element, coded_sub_block_flag, is 0.

Therefore, in an embodiment according to FIG. 6, it is possible not to code 'coded_sub_block_flag=0' for forty nine 4×4 subblocks in total included in the 64×64 current block, when compared with the embodiment according to FIG. 5. Since coded_sub_block_flag is coded as a context-coded bin, the embodiment according to FIG. 6 may also have an advantage in terms of throughput. That is, when it is regarded that the high frequency zeroing has been applied in the residual coding process, and that a non-zero significant coefficient does not exist in a zeroed-out region, the computational complexity required in the transform process may be reduced in terms of memory.

In an example, a residual coding method to be described later in FIGS. 7A to 8B may be performed based on the embodiments described in FIGS. 5 and 6. In another example, an encoding method to be described later in FIG. 9 or a decoding method to be described later in FIG. 11 may be performed based on the embodiments described in FIGS. 5 and 6.

Figure 7A:
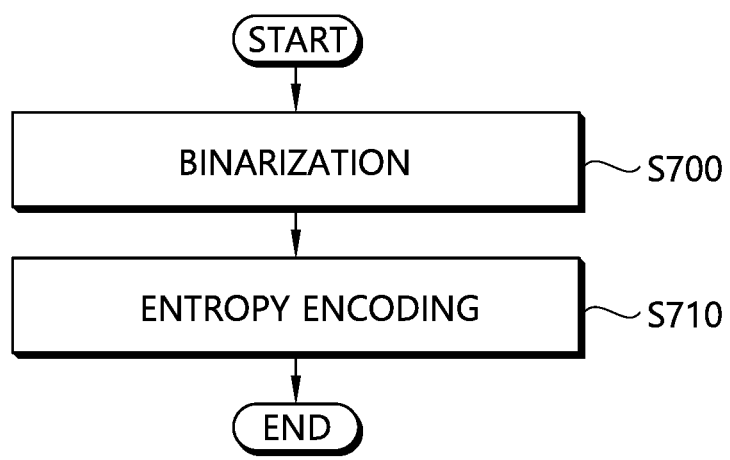
FIGS. 7A and 7B are drawings for explaining the configuration and operation of an entropy encoder according to an embodiment.
Figure 7B:
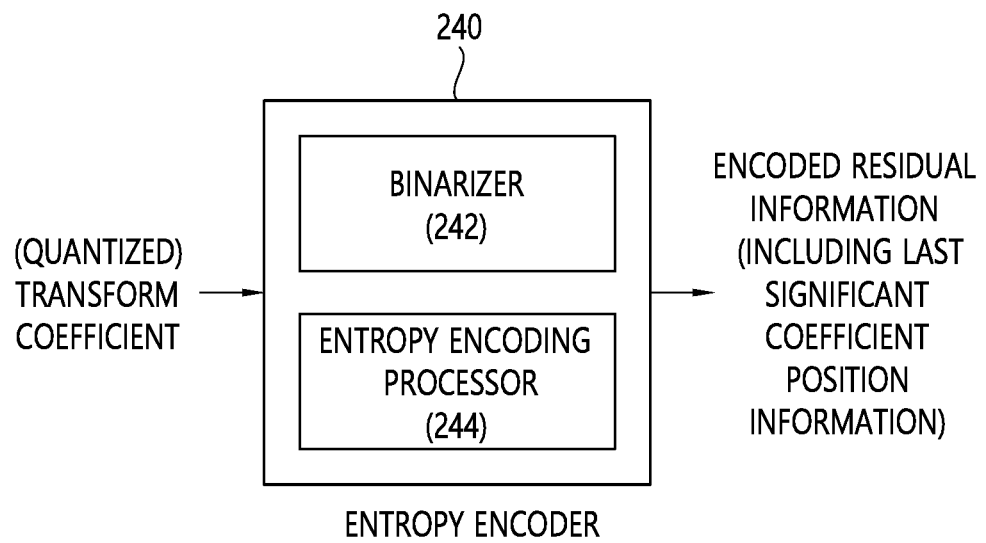

FIGS. 7A and 7B are drawings for explaining the configuration and operation of an entropy encoder according to an embodiment.

Referring to FIGS. 7A and 7B, the encoding apparatus (entropy encoder) may perform a residual coding procedure on (quantized) transform coefficients. The (quantized) transform coefficients may be transform coefficients to which the high frequency zeroing has been applied in an example, or may include non-zero high frequency coefficients in another example, and in this case, the high frequency coefficients may be regarded or treated as 0 in a residual coding procedure performed in the entropy encoder. The encoding apparatus may perform residual coding on (quantized) transform coefficients in the current block (current coding block (CB) or current transform block (TB)) according to a scan order as described above in FIG. 4. The encoding apparatus, for example, may generate and encode various syntax elements for residual information as written in Table 3 above. S700 and S710 may be incorporated into the residual information encoding procedure of FIG. 2.

The encoding apparatus may perform binarization on syntax elements related to residual (S700). In one example, the binarization according to the embodiments described above in FIG. 4 may be performed on the last_sig_coeff_x_prefix and last_sig_coeff_y_prefix. The last_sig_coeff_x_prefix and the last_sig_coeff_y_prefix may be derived based on position of a last significant coefficient in a current block. Further, binarization may progress for the rest of syntax elements of Table 3 above according to a predetermined method. In another example, binarization may be performed on transform_skip_flag, last_sig_coeff_x_suffix, last_sig_coeff_y_suffix, coded_sub_block_flag, sig_coeff_flag, par_level_flag, rem_abs_gt1_flag, rem_abs_gt2_flag, coeff_sign_flag, mts_idx, or the like according to a fixed-length binarization process, and on abs_remainder, binarization corresponding thereto may be performed.

The last_sig_coeff_x_prefix and last_sig_coeff_y_prefix may represent an example of last significant coefficient prefix information on position of a last non-zero transform coefficient among the transform coefficients for the current block. More specifically, last_sig_coeff_x_prefix may represent an example of an x-axis prefix information, which is one of the last significant coefficient prefix information, and last_sig_coeff_y_prefix may represent an example of a y-axis prefix information, which is one of the last significant coefficient prefix information. 0 may be used as a value of cRiceParam in the binarization process for the last_sig_coeff_x_prefix and last_sig_coeff_y_prefix. The encoding apparatus may derive a bin string for each of the last_sig_coeff_x_prefix and last_sig_coeff_y_prefix through the binarization procedure. The binarization procedure may be performed by a binarizer 242 in the entropy encoder 240.

According to an embodiment, cMax value for each of last_sig_coeff_x_prefix and last_sig_coeff_y_prefix may be derived based on whether the high frequency zeroing is applied. Specific equation for deriving cMax has ever been previously described in FIG. 4. The cMax may represent a maximum length of a codeword (bin string) derived in the binarization process for last_sig_coeff_x_prefix or last_sig_coeff_y_prefix. When decreasing the value of cMax, the length of the codeword for last_sig_coeff_x_prefix or last_sig_coeff_y_prefix may be effectively shortened. And as the coded bins reduced by shortening the codeword are context-coded bins, there may be an advantage in terms of an image coding throughput.

The encoding apparatus may perform entropy encoding on the residual coding-related syntax elements (S710). The encoding apparatus may omit the transform coefficient scan for the region to which the high frequency zeroing is applied, and may not encode coded_sub_block_flag for the region to which the high frequency zeroing is applied. That is, in generating the residual coding syntax (or bitstream), the encoding apparatus may not include the syntax element, coded_sub_block_flag, for the subblock located at the region to which the high frequency zeroing is applied. The encoding apparatus may encode coded_sub_block_flag only for the region to which the high frequency zeroing is not applied, that is, a top-left transform coefficient region (or low frequency transform coefficient region), and incorporate the encoded coded_sub_block_flag into the residual coding syntax (or bitstream). Through this, a bit number assigned to the residual coding may be reduced.

The encoding apparatus may context-based or bypass-based encode the bin string based on a entropy coding scheme such as context-adaptive arithmetic coding (CABAC) or context-adaptive variable length coding (CAVLC), and the output thereof may be incorporated into the bitstream. The entropy encoding procedure may be performed by an entropy encoding processor 244 in the entropy encoder 240. The bitstream may include various information for image/video decoding, such as prediction information or the like, other than residual information including information on last_sig_coeff_x_prefix and last_sig_coeff_y_prefix as described above. The bitstream may be transferred to the decoding apparatus through a (digital) storage medium or a network.

Figure 8A:
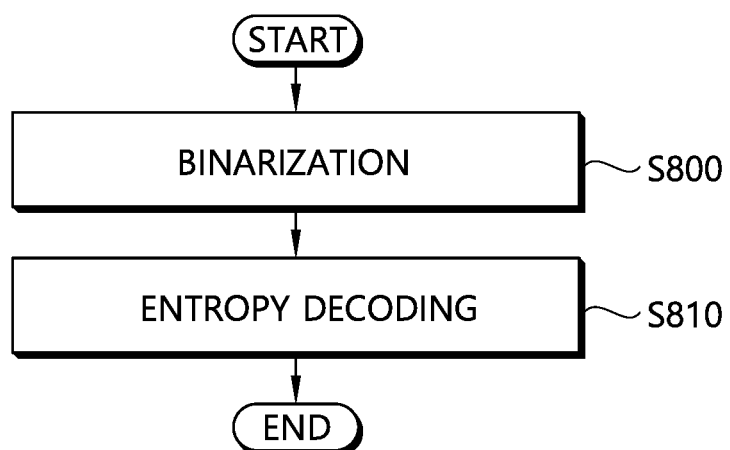
FIGS. 8A and 8B are drawings for explaining the configuration and operation method of an entropy decoder according to an embodiment.
Figure 8B:
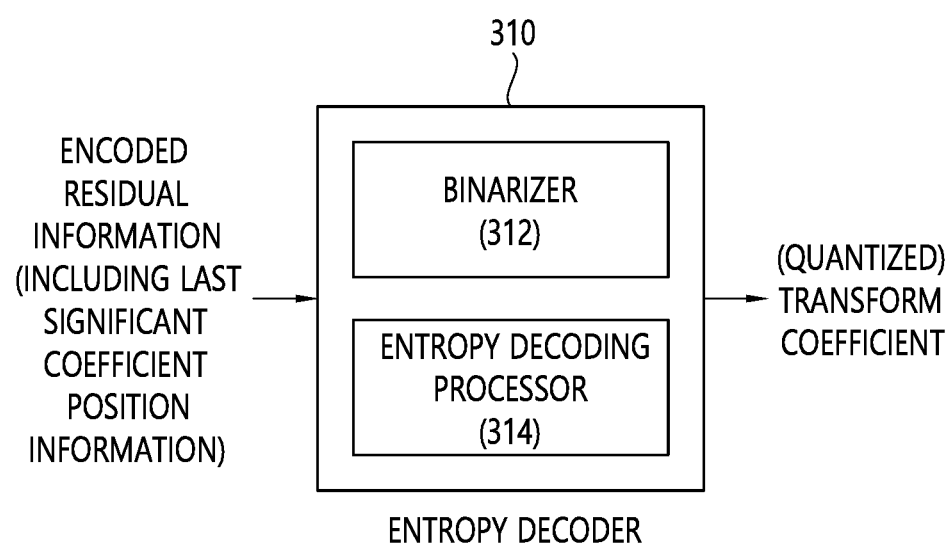

FIGS. 8A and 8B are drawings for explaining the configuration and operation method of an entropy decoder according to an embodiment.

Referring to FIGS. 8A and 8B, the decoding apparatus (entropy decoder) may derive (quantized) transform coefficients by decoding encoded residual information. The decoding apparatus may derive (quantized) transform coefficients by decoding encoded residual information for a current block (current coding block or current transform block) as previously described in FIG. 4. For example, the decoding apparatus may decode various syntax elements related to such residual information as written in Table 3, analyze values of associated syntax elements, and derive the (quantized) transform coefficients based on a value of the analyzed syntax elements. S800 to S810 may be incorporated into a procedure for deriving above-described (quantized) transform coefficients of FIG. 3.

The decoding apparatus may perform binarization on syntax elements related to residual (S800). For example, the binarization based on the embodiments described above in FIG. 4 may be performed on the last_sig_coeff_x_prefix and last_sig_coeff_y_prefix. In this case, 0 may be used as a value of cRiceParam. The decoding apparatus may derive an available bin string for respective available values of the last_sig_coeff_x_prefix and last_sig_coeff_y_prefix through the binarization procedure. The binarization procedure may be performed by a binarizer 312 in the entropy decoder 310. According to an embodiment, cMax value for each of last_sig_coeff_x_prefix and last_sig_coeff_y_prefix may be derived based on whether the high frequency zeroing is applied. Specific equation for deriving cMax has ever been previously described in FIG. 4.

The cMax may represent a maximum length of a codeword (bin string) derived in the binarization process for last_sig_coeff_x_prefix or last_sig_coeff_y_prefix. When decreasing the value of cMax, the length of the codeword for last_sig_coeff_x_prefix or last_sig_coeff_y_prefix may be effectively shortened. And as the coded bins reduced by shortening the codeword are context-coded bins, there may be an advantage in terms of an image coding throughput.

Meanwhile, binarization may progress for the rest of syntax elements of Table 3 above according to a predetermined method. For example, binarization may be performed on transform_skip_flag, last_sig_coeff_x_suffix, last_sig_coeff_y_suffix, coded_sub_block_flag, sig_coeff_flag, par_level_flag, rem_abs_gt1_flag, rem_abs_gt2_flag, coeff_sign_flag, mts_idx, or the like according to a fixed-length binarization process, and on abs_remainder, binarization corresponding thereto may be performed.

The decoding apparatus may perform entropy decoding on the residual coding-related syntax elements (S810). While parsing and decoding sequentially respective bins for each syntax element, the decoding apparatus may compare the derived bin string with the available bin strings. When a derived bin string is the same as one of the available bin strings, the value corresponding to the bin string may be derived as a value of the syntax element. When a derived bin string is the same as none of the available bin strings, the comparison procedure may be performed after further parsing and decoding a next bit in the bitstream. Through this process, even without using a start bit or an end bit for specific information (specific syntax element) in a bitstream, the information can be signaled using a variable length bit, through which relatively smaller bit may be assigned to a low value, thus increasing an overall coding efficiency.

The decoding apparatus may omit the transform coefficient scan for the region to which the high frequency zeroing is applied, may not parse and/or decode coded_sub_block_flag for the region to which the high frequency zeroing is applied, and may consider it as 0. That is, the decoding apparatus may infer that, even without performing a scan on the subblock located at the region to which the high frequency zeroing is applied, the last significant coefficient is not located therein, may not parse from the residual coding syntax (or bitstream) the syntax element, coded_sub_block_flag, for the subblock located at the region to which the high frequency zeroing is applied, and may infer that the value of the syntax element, coded_sub_block_flag, is 0.

Further, the decoding apparatus may infer that the syntax element, coded_sub_block_flag, which has been parsed and/or decoded in the residual information (e.g., residual coding syntax) for the current block, is not for the region to which the high frequency zeroing is applied, and may infer that the syntax element, coded_sub_block_flag, which has been first parsed and/or decoded in the residual information (e.g., residual syntax) for the top-left transform block, is for the subblock which is first derived based on the scan order.

The decoding apparatus may perform context-based or bypass-based decoding on respective bins in the bin string from a bitstream based on an entropy coding technique such as the CABAC, the CAVLC or the like. The entropy decoding procedure may be performed by an entropy decoding processor 314 in the entropy decoder 310. The decoding apparatus may derive a position of a last significant coefficient based on a value of the last_sig_coeff_x_prefix and a value of the last_sig_coeff_y_prefix. Specific calculation, for example, may be performed based on Table 6 below.

TABLE 6

The column position of the last significant coefficient in scanning order within a transform block LastSignificantCoeffX is derived as follows:
- If last_sig_coeff_x_suffix is not present, the following applies:
LastSignificantCoeffX = last_sig_coeff_x_prefix
- Otherwise (last_sig_coeff_x_suffix is present), the following applies:
LastSignificantCoeffX= (1<<((last_sig_coeff_x_prefix>>1)−1)) * (2+(last_sig_coeff_x_prefix&1)) + last_sig_coeff_x_suffix TABLE 6-continued The row position of the last significant coefficient in scanning order
within a transform block LastSignificantCoeffY is derived as follows:
-If last_sig_coeff_y_suffix is not present, the following applies:
LastSignificantCoeffY = last_sigcoeff_y_prefix
- Otherwise (last_sig_coeff_y_suffix is present), the following applies:
LastSignificantCoeffY=(1<<((last_sig_coeff_y_prefix>>1)−1))*
(2+(last_sig_coeff_y_prefix&1))+last_sig_coeff_y_suffix In Table 6, LastSignificantCoeffX may represent an x-axis position of a last non-zero significant coefficient in the current (transform) block, and LastSignificantCoeffY may represent a y-axis position of a last non-zero significant coefficient in the current (transform) block.

The bitstream may include various information for image/video decoding, such as prediction information or the like, other than residual information including information on last_sig_coeff_x_prefix and last_sig_coeff_y_prefix as described above. The bitstream may be transferred to the decoding apparatus through a (digital) storage medium or a network like the previous description.

The decoding apparatus may derive residual samples for a current block by performing a dequantization procedure and/or an inverse transform procedure based on the (quantized) transform coefficients. Reconstructed samples may be generated based on the residual samples and prediction samples derived through inter/intra prediction, and a reconstructed picture including the reconstructed samples may be generated.

Figure 9:
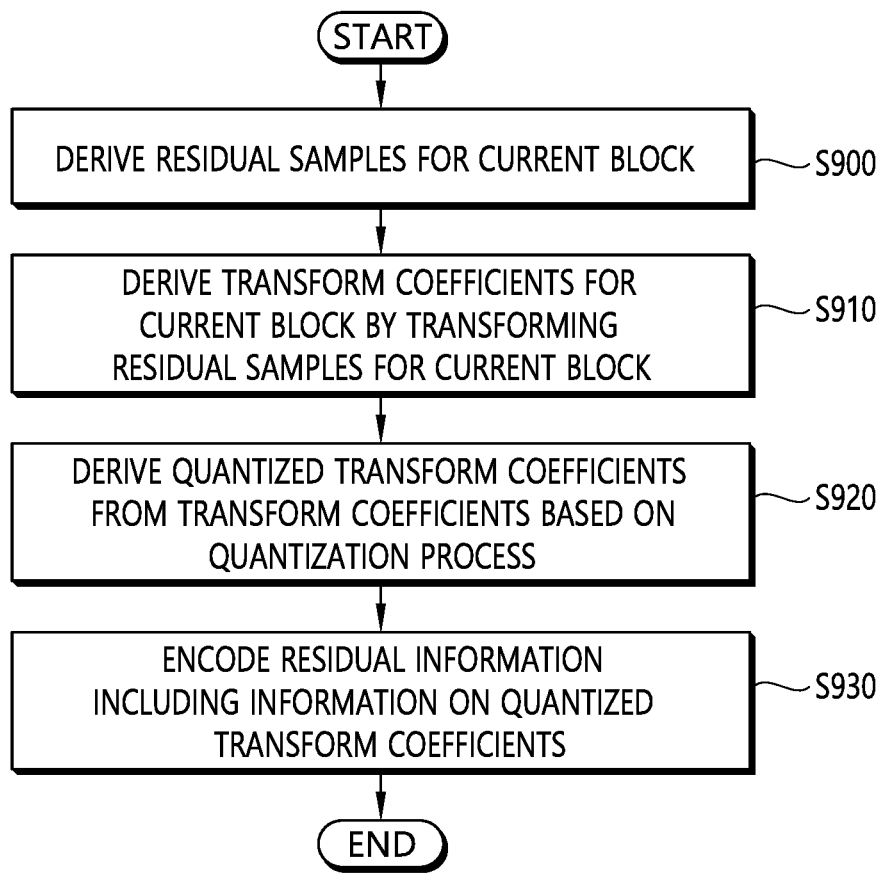
FIG. 9 is a flowchart showing operation of an encoding apparatus according to an embodiment.
Figure 10:
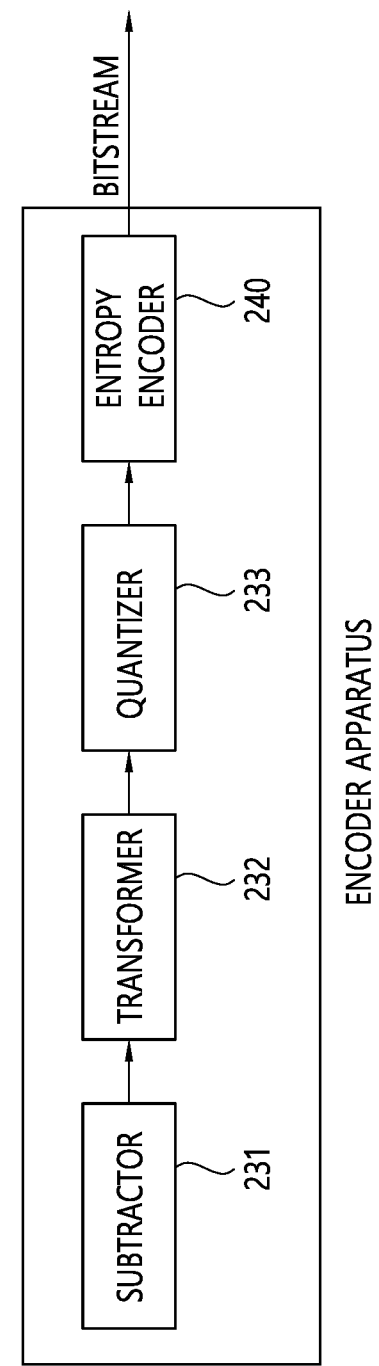
FIG. 10 is a block diagram showing a configuration of an encoding apparatus according to an embodiment.

FIG. 9 is a flowchart showing operation of an encoding apparatus according to an embodiment, and FIG. 10 is a block diagram showing a configuration of an encoding apparatus according to an embodiment.

Figure 11:
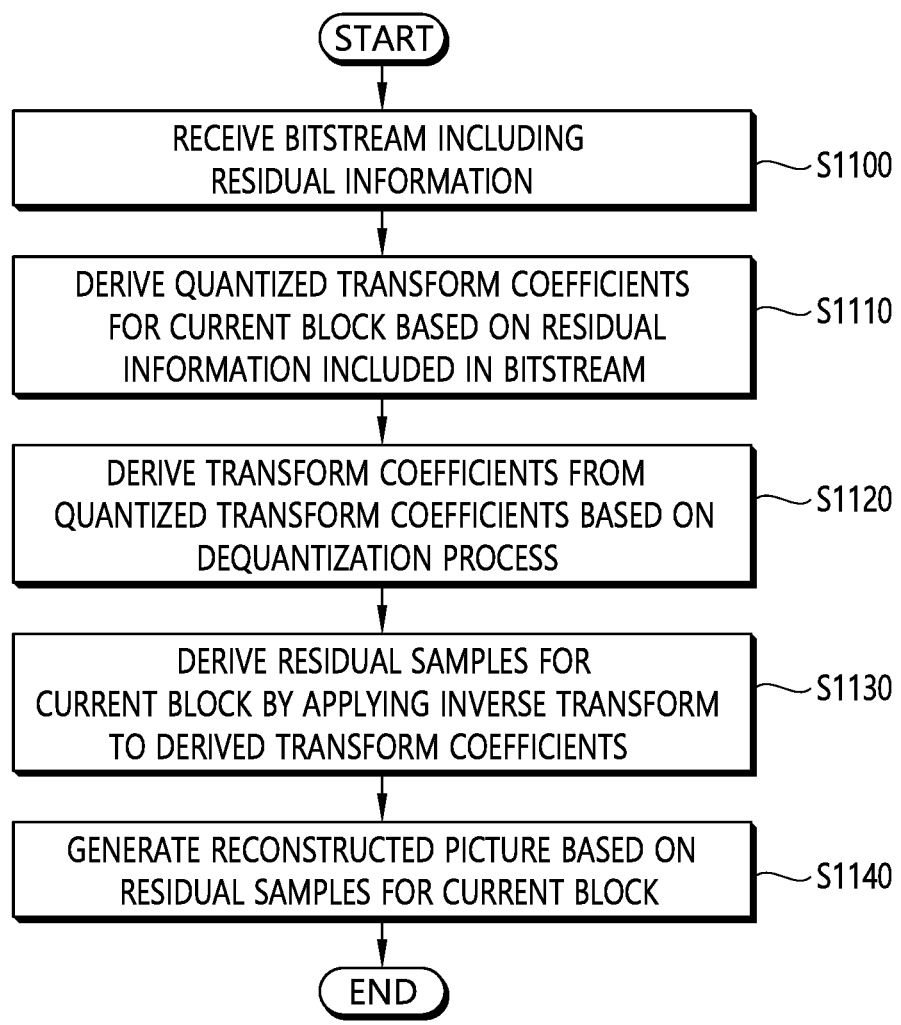
FIG. 11 is a flowchart showing operation of a decoding apparatus according to an embodiment.
Figure 12:
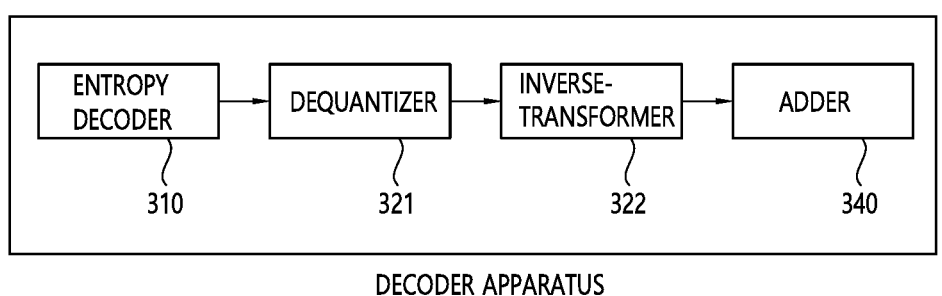
FIG. 12 is a block diagram showing a configuration of a decoding apparatus according to an embodiment.

The encoding apparatus according to FIGS. 9 and 10 may perform operations corresponding to those of a decoding apparatus according to FIGS. 11 and 12. Therefore, operations of the decoding apparatus to be described later in FIGS. 11 and 12 may be similarly applied to the encoding apparatus according to FIGS. 9 and 10.

Each step disclosed in FIG. 9 may be performed by the encoding apparatus 200 disclosed in FIG. 2. More specifically, S900 may be performed by the subtractor 231 disclosed in FIG. 2; S910, by the transformer 232 disclosed in FIG. 2; S920, by the quantizer 233 disclosed in FIG. 2; and S930, by the entropy encoder 240 disclosed in FIG. 2. Further, operations according to S900 to S930 are based on some of contents described above in FIGS. 4 to 8. Therefore, an explanation for the specific content duplicated with contents described above in FIG. 2, and 4 to 8B will be omitted or made briefly.

As shown in FIG. 10, the encoding apparatus according to an embodiment may include the subtractor 231, the transformer 232, the quantizer 233, and the entropy encoder 240. However, according to circumstances, it may occur that all the components shown in FIG. 10 are not essential components of the encoding apparatus, and the encoding apparatus may be embodied by more or less components than those shown in FIG. 10.

In the encoding apparatus according to an embodiment, each of the subtractor 231, the transformer 232, the quantizer 233, and the entropy encoder 240 may be embodied by a separate chip, or at least two or more components may be embodied through a single chip.

The encoding apparatus according to an embodiment may derive residual samples for a current block (S900). More specifically, the subtractor 231 of the encoding apparatus may derive residual samples for the current block.

The encoding apparatus according to an embodiment may derive transform coefficients for the current block by transforming the residual samples for the current block (S910). More specifically, the transformer 232 of the encoding apparatus may derive transform coefficients for the current block by transforming the residual samples for the current block.

The encoding apparatus according to an embodiment may derive quantized transform coefficients from the transform coefficients based on a quantization process (S920). More specifically, the quantizer 233 of the encoding apparatus may derive quantized transform coefficients from the transform coefficients based on a quantization process.

The encoding apparatus according to an embodiment may encode residual information including information on the quantized transform coefficients (S930). More specifically, the entropy encoder 240 of the encoding apparatus may encode the residual information including information on the quantized transform coefficients.

In an embodiment, the current block may represent a current transform block (TB or TU) or a current coding block (CB or CU).

In an embodiment, each of the transform coefficients for the current block may be related to a high frequency transform coefficient region consisting of transform coefficient 0, or a low frequency transform coefficient region including at least one significant transform coefficient.

In an embodiment, a transform coefficient scanning may be performed on transform coefficients related to the low frequency transform coefficient region among transform coefficients for the current block.

In an embodiment, the residual information may include a coded subblock flag indicating whether transform coefficient levels of transform coefficients for a subblock in the current block are all 0, and the subblock may be related to the low frequency transform coefficient region. In an embodiment, the coded subblock flag may be written as coded_sub_block_flag.

In an embodiment, the transform coefficient scanning may not be performed on transform coefficients related to the high frequency transform coefficient region.

In an embodiment, the width of the low frequency transform coefficient region or the height of the low frequency transform coefficient region may be equal to or less than 32.

In an embodiment, the width of the low frequency transform coefficient region may be determined to be the same as a width of the current block based on determination that the width of the current block is less than 32. The height of the low frequency transform coefficient region may be determined to be the same as a height of the current block based on determination that the height of the current block is less than 32. The width of the low frequency transform coefficient region may be determined to be 32 based on determination that the width of the current block is equal to or greater than 32. The height of the low frequency transform coefficient region may be determined to be 32 based on determination that the height of the current block is equal to or greater than 32.

In an embodiment, the width of the low frequency transform coefficient region and the height of the low frequency transform coefficient region may be determined based on Equation 5 below:

$$\log 2(ZoTb\text{Width}) = \text{Min}(\log 2(Tb\text{Width}), 5)$$

$$\log 2(ZoTb\text{Height}) = \text{Min}(\log 2(Tb\text{Height}), 5) \quad \text{[Equation 5]}$$

In Equation 5, the ZoTbWidth may represent the width of the low frequency transform coefficient region; the ZoTbHeight, the height of the low frequency transform coefficient region; the TbWidth, a width of the current block; and the TbHeight, a height of the current block.

In an embodiment, zeroing may be applied to transform coefficients related to the high frequency transform coefficient region, and the number of the transform coefficients to which the zeroing has been applied may be determined based on the width of the low frequency transform coefficient region or the height of the low frequency transform coefficient region.

According to the encoding apparatus and the operation method of the encoding apparatus of FIGS. 9 and 10, the encoding apparatus may derive the residual samples for the current block (S900), derive the transform coefficients for the current block by transforming the residual samples for the current block (S910), derive the quantized transform coefficients from the transform coefficients based on a quantization process (S920), and encode the residual information including the information on the quantized transform coefficients (S930), wherein each of the transform coefficients for the current block may be related to a high frequency transform coefficient region consisting of transform coefficient 0, or a low frequency transform coefficient region including at least one significant transform coefficient, and a transform coefficient scanning may be performed on transform coefficients related to the low frequency transform coefficient region among transform coefficients for the current block. That is, it is possible to increase the image coding efficiency by omitting a transform coefficient scan for a transform coefficient group related to a region to which high frequency zeroing is applied, and omitting signaling of a coded subblock flag for the transform coefficient group.

FIG. 11 is a flowchart showing operation of a decoding apparatus according to an embodiment, and FIG. 12 is a block diagram showing a configuration of a decoding apparatus according to an embodiment.

Each of steps disclosed in FIG. 11 may be performed by the decoding apparatus 300 disclosed in FIG. 3. More specifically, S1100 and S1110 may be performed by the entropy decoder 310 disclosed in FIG. 3; S1120, by the dequantizer 321 disclosed in FIG. 3; S1130, by the inverse transformer 322 disclosed in FIG. 3; and S1140, by the adder 340 disclosed in FIG. 3. Further, operations according to S1100 to S1140 are based on some of contents described above in FIGS. 4 to 8B. Therefore, an explanation for the specific content duplicated with contents described above in FIGS. 3 to 8B will be omitted or made briefly.

As shown in FIG. 12, the decoding apparatus according to an embodiment may include the entropy decoder 310, the dequantizer 321, the inverse transformer 322, and the adder 340. However, according to circumstances, it may occur that all the components shown in FIG. 12 are not essential components of the decoding apparatus, and the decoding apparatus may be embodied by more or less components than those shown in FIG. 12.

In the decoding apparatus according to an embodiment, each of the entropy decoder 310, the dequantizer 321, the inverse transformer 322, and the adder 340 may be embodied by a separate chip, or at least two or more components may be embodied through a single chip.

The decoding apparatus according to an embodiment may receive a bitstream including residual information (S1100). More specifically, the entropy decoder 310 of the decoding apparatus may receive a bitstream including residual information.

The decoding apparatus according to an embodiment may derive quantized transform coefficients for a current block based on residual information included in a bitstream (S1110). More specifically, the entropy decoder 310 of the decoding apparatus may derive the quantized transform coefficient for the current block based on the residual information included in the bitstream.

The decoding apparatus according to an embodiment may derive transform coefficients from the quantized transform coefficients based on a dequantization process (S1120). More specifically, the dequantizer 321 of the decoding apparatus may derive the transform coefficients from the quantized transform coefficients based on the dequantization process.

The decoding apparatus according to an embodiment may derive residual samples for the current block by applying inverse transform to the derived transform coefficients (S1130). More specifically, the inverse transformer 322 of the decoding apparatus may derive the residual samples for the current block by applying the inverse transform to the derived transform coefficients.

The decoding apparatus according to an embodiment may generate a reconstructed picture based on the residual sample for the current block (S1140). More specifically, the adder 340 of the decoding apparatus may generate the reconstructed picture based on the residual sample for the current block.

In an example, a unit of the current block may be a transform block TB. In an embodiment, a unit of the current block may be a coding block (CB).

In an embodiment, each of the transform coefficients for the current block may be related to a high frequency transform coefficient region consisting of transform coefficient 0, or a low frequency transform coefficient region including at least one significant transform coefficient.

In an embodiment, a transform coefficient scanning may be performed on transform coefficients related to the low frequency transform coefficient region among transform coefficients for the current block.

In an embodiment, the residual information may include a coded subblock flag indicating whether transform coefficient levels of transform coefficients for a subblock in the current block are all 0, and the subblock may be related to the low frequency transform coefficient region. In an embodiment, the coded subblock flag may be written as coded_sub_block_flag.

In an embodiment, the transform coefficient scanning may not be performed on transform coefficients related to the high frequency transform coefficient region.

In an embodiment, the width of the low frequency transform coefficient region or the height of the low frequency transform coefficient region may be equal to or less than 32.

In an embodiment, the width of the low frequency transform coefficient region may be determined to be the same as a width of the current block based on determination that the width of the current block is less than 32. The height of the low frequency transform coefficient region may be determined to be the same as a height of the current block based on determination that the height of the current block is less than 32. The width of the low frequency transform coefficient region may be determined to be 32 based on determination that the width of the current block is equal to or greater than 32. The height of the low frequency transform coefficient region may be determined to be 32 based on determination that the height of the current block is equal to or greater than 32.

In an embodiment, the width of the low frequency transform coefficient region and the height of the low frequency transform coefficient region may be determined based on Equation 6 below:

$$\log 2(ZoTbWidth) = \text{Min}(\log 2(TbWidth), 5)$$

$$\log 2(ZoTbHeight) = \text{Min}(\log 2(TbHeight), 5) \quad \text{[Equation 6]}$$

In Equation 6, the ZoTbWidth may represent the width of the low frequency transform coefficient region; the ZoTbHeight, the height of the low frequency transform coefficient region; the TbWidth, a width of the current block; and the TbHeight, a height of the current block.

In an embodiment, zeroing may be applied to transform coefficients related to the high frequency transform coefficient region, and the number of the transform coefficients to which the zeroing has been applied may be determined based on the width of the low frequency transform coefficient region or the height of the low frequency transform coefficient region.

According to the decoding apparatus and the operation method of the decoding apparatus of FIGS. 11 and 12, the decoding apparatus may receive a bitstream including residual information (S1100), derive quantized transform coefficients for a current block based on the residual information included in the bitstream (S1110), derive transform coefficients from the quantized transform coefficients based on a dequantization process (S1120), derive residual samples for the current block by applying inverse transform to the derived transform coefficients (S1130), and generate a reconstructed picture based on residual samples for the current block (S1140), wherein each of the transform coefficients for the current block may be related to a high frequency transform coefficient region consisting of transform coefficient 0, or a low frequency transform coefficient region including at least one significant transform coefficient, and a transform coefficient scanning may be performed on transform coefficients related to the low frequency transform coefficient region among transform coefficients for the current block. That is, it is possible to increase the image coding efficiency by omitting a transform coefficient scan for a transform coefficient group related to a region to which high frequency zeroing is applied, and omitting signaling of a coded subblock flag for the transform coefficient group.

In an embodiment, the residual coding process described above in FIGS. 4 to 10 may be based on the content of English specification below.

Abstract

In this proposal, the binarization of last significant coefficient position is modified to reduce the maximum number of context coded bins. Specifically, the number of context coded bins for large block (i.e., 64×64, 64×N, N×64) in worst case scenario is reduced from 11 to 9. Experimental results show 0.01%, 0%, and −0.02% BD-rate reductions on Y, Cb, and Cr components, respectively, compared to VTM3.0 in all-intra configuration, and 0.01%, −0.01%, and −0.01% BD-rate reductions in random access configuration.

1 Introduction

It is known that large block partitions typically present less residuals and the energy is more concentrated in low-frequency coefficients in the transform domain. In VTM3.0 [1], high frequency transform coefficients are zeroed out for the transform blocks with size (width or height, or both width and height) equal to 64. Thus, for a W×H transform block, where W indicates the block width and H the block height, only the top-left (W==64 ? 32: W)×(H==64 ? 32: H) transform coefficients are retained.

In [1], the prefix last_sig_coeff_x_prefix and last_sig_coeff_y_prefix are both context coded using truncated Rice binarization with cMax=(log 2TbSize<<1)−1. Here, if the syntax element to be parsed is last_sig_coeff_x_prefix, log 2TbSize is set equal to log 2TbWidth and otherwise, log 2TbSize is set equal to log 2TbHeight. That is, the maximum possible magnitude is determined by the transform block width or height. In the worst case scenario, the number of the bins that use context modelling is equal to 11. Table 7 shows the binarization for W=64 or H=64 in VTM3.0, wherein X means 0 or 1.

TABLE 7

| Magnitude of last position component | last_sig_coeff_x_prefixorlast_sig_coeff_y_prefix(context coded bin) | last_sig_coeff_x_suffixorlast_sig_coeff_y_suffix(bypass bin) |
|---|---|---|
| 0 | 0 | |
| 1 | 10 | |
| 2 | 110 | |
| 3 | 1110 | |
| 4, 5 | 11110 | X |
| 6, 7 | 111110 | X |
| 8~11 | 1111110 | XX |
| 12~15 | 11111110 | XX |
| 16~23 | 111111110 | XXX |
| 24~31 | 1111111110 | XXX |
| 32~47 | 11111111110 | XXXX |
| 48~63 | 11111111111 | XXXX |

2. Proposed methodThis contribution is proposed on top of JVET-M0250 [2]. In the proposed method, whether the current coefficient group belongs to the high-frequency zeroing region is checked. Using this information, the unnecessary coded_sub_block_flag (CSBF) coding for the high-frequency zeroing region can be skipped.

In one embodiment, CSBF coding method considering the high-frequency zeroing region may be proposed. If a first condition for Last or first coefficient group is satisfied, the value of CSBF may be inferred to 1. If the first condition for last or first coefficient group is not satisfied, a second condition for high-frequency zeroing region is checked. If the second condition for high-frequency zeroing region is satisfied, there is no CSBF coding. If the second condition for high-frequency zeroing is not satisfied, context index is derived and CSBF coding is performed.

A last position coding scheme is proposed for large block-size transforms. Compared to VTM3.0, the proposed coding scheme uses less context coded bins in the worst case scenario. The codeword in the proposed scheme still starts with a truncated Rice code and followed by a fixed length code. After high-frequency zeroing, for a WxH transform block, only the top-left min(W, 32)×min(H, 32) transform coefficients are kept. Thus, the maximum possible codeword length of the prefix last_sig_coeff_x_prefix or last_sig_coeff_y_prefix is derived as:

$cMax = (\min(\log 2TbSize, 5) << 1) - 1$.

Table 8 shows the binarization for W=64 or H=64, wherein X means 0 or 1. Here, the different parts are emphasized.

TABLE 8

| Magnitude of last position component | last_sig_coeff_x_prefix or last_sig_coeff_y_prefix (context coded bin) | last_sig_coeff_x_suffix or last_sig_coeff_y_suffix (bypass bin) |
|---|---|---|
| 0 | 0 | |
| 1 | 10 | |
| 2 | 110 | |
| 3 | 1110 | |
| 4, 5 | 11110 | X |
| 6, 7 | 111110 | X |
| 8~11 | 1111110 | XX |
| 12~15 | 11111110 | XX |
| 16~23 | 111111110 | XXX |
| 24~31 | 111111111 | XXX |
| 32~47 | N/A | N/A |
| 48~63 | N/A | N/A |

TABLE 9

| Magnitude of last position component | VTM3.0 | Proposed method |
|---|---|---|
| 0 | 1 | 1 |
| 1 | 2 | 2 |
| 2 | 3 | 3 |
| 3 | 4 | 4 |
| 4, 5 | 5 | 5 |
| 6, 7 | 6 | 6 |
| 8~11 | 7 | 7 |
| 12~15 | 8 | 8 |
| 16~23 | 9 | 9 |
| 24~31 | 10 | 9 |
| 32~47 | 11 | N/A |
| 48~63 | 11 | N/A |

Table 9 shows comparison of codeword length for the prefix (context coded bins) when W=64 or H=64 and VTM3.0. The context coded bins can be as long as 9 in the proposed method, while it is up to 11 bins in VTM3.0. Note that when the magnitude of the last position component in the range of 24-31, the number of context coded bins is reduced from 10 to 9. 3. Experimental results The proposed method has been implemented on the VTM3.0 software. The simulations were performed following the common test conditions defined in JVET-L1010 [3]. In every case, the anchor is the VTM3.0 software. Encoding time and decoding time come from the cross-check results [4]. Table 10 shows Experimental results for all-intra (AI) test condition; anchor is VTM3.0

TABLE 10

| | All Intra Main10 Over VTM-3.0 | | | | |
|---|---|---|---|---|---|
| | Y | U | V | EncT | DecT |
| Class A1 | 0.03% | −0.07% | 0.03% | 100% | 101% |
| Class A2 | 0.02% | 0.00% | −0.03% | 100% | 100% |
| Class B | 0.01% | 0.05% | −0.02% | 100% | 102% |
| Class C | 0.00% | 0.01% | −0.03% | 100% | 101% |
| Class E | 0.02% | −0.02% | −0.03% | 100% | 99% |
| Overall | 0.01% | 0.00% | −0.02% | 100% | 101% |
| Class D | 0.00% | 0.01% | −0.01% | 100% | 100% |
| Class F | −0.01% | 0.03% | 0.02% | 100% | 99% |

Table 11 shows Experimental results for random-access (RA) test condition; anchor is VTM3.0

TABLE 11

| | Random access Main10 Over VTM-3.0 | | | | |
|---|---|---|---|---|---|
| | Y | U | V | EncT | DecT |
| Class A1 | 0.05% | −0.09% | 0.00% | | |
| Class A2 | 0.01% | 0.07% | 0.03% | | |
| Class B | −0.01% | −0.02% | −0.04% | 100% | 100% |
| Class C | 0.00% | 0.02% | −0.01% | 99% | 100% |
| Class E | | | | | |
| Overall | 0.01% | −0.01% | −0.01% | | |
| Class D | 0.00% | 0.03% | 0.06% | 100% | 100% |
| Class F | −0.01% | −0.03% | −0.07% | 100% | 99% |

4. Reference [1] B. Bross, et al., "Versatile Video Coding (Draft 3)," Joint Video Exploration Team (JVET) of ITU-T SG 16 WP 3 and ISO/IEC JTC1/SC 29/WG 11 JVET-L1001, 12th meeting, Macao, Conn., 3-12 Oct. 2018.

[2] J. Choi, et al., "Non-CE7: Simplified CSBF coding for large block-size transforms," Joint Video Exploration Team (JVET) of ITU-T SG 16 WP 3 and ISO/IEC JTC1/SC 29/WG 11 JVET-M0250, 13th meeting, Marrakech, Mass., 9-18 Jan. 2019.

[3] F. Bossen, et al., "JVET common test conditions and software reference configurations for SDR video" Joint Video Exploration Team (JVET) of ITU-T SG 16 WP 3 and ISO/IEC JTC1/SC 29/WG 11 JVET-L1010, 12th Meeting, Macao, Conn., 3-12 Oct. 2018.

[4] H. Schwarz, "Crosscheck of JVET-M0251 (Non-CE7: Last position coding for large block-size transforms),"

Joint Video Exploration Team (JVET) of ITU-T SG 16 WP 3 and ISO/IEC JTC1/SC 29/WG 11 JVET-M0646, 13$^{th}$ meeting, Marrakech, Mass., 9-18 Jan. 2019.

5. Patent Rights Declaration(s)

LG Electronics Inc. may have current or pending patent rights relating to the technology described in this contribution and, conditioned on reciprocity, is prepared to grant licenses under reasonable and non-discriminatory terms as necessary for implementation of the resulting ITU-T Recommendation I ISO/IEC International Standard (per box 2 of the ITU-T/ITU-R/ISO/IEC patent statement and licensing declaration form).

6. Specification

TABLE 12

|  | Descriptor |
|---|---|
| residual_coding( x0, y0, log2TbWidth, log2TbHeight, cIdx ) { | |
| if( transform_skip_enabled_flag && | |
| ( cIdx != 0 \|\| tu_mts_flag[ x0 ][ y0 ] = = 0 ) && | |
| ( log2TbWidth <= 2 ) && ( log2TbHeight <= 2 ) ) | |
| transform_skip_flag[ x0 ][ y0 ][ cIdx ] | ae(v) |
| last_sig_coeff_x_prefix | ae(v) |
| last_sig_coeff_y_prefix | ae(v) |
| if( last_sig_coeff_x_prefix > 3 ) | |
| last_sig_coeff_x_suffix | ae(v) |
| if( last_sig_coeff_y_prefix > 3 ) | |
| last_sig_coeff_y_suffix | ae(v) |
| log2SbSize = ( Min( log2TbWidth, log2TbHeight ) < 2 ? 1 : 2 ) | |
| numSbCoeff = 1 << ( log2SbSize << 1 ) | |
| lastScanPos = numSbCoeff | |
| log2TbWidth = Min( log2TbWidth, 5 ) | |
| log2TbHeight = Min( log2TbHeight, 5 ) | |
| lastSubBlock = (1 << ( | |
| log2TbWidth + log2TbHeight − 2 * log2SbSize ) ) −1 | |
| do { | |
| if( lastScanPos = = 0 ) { | |
| lastScanPos = numSbCoeff | |
| lastSubBlock− − | |
| } | |
| lastScanPos− − | |
| xS = | |
| DiagScanOrder[ log2TbWidth − log2SbSize ][ log2TbHeight −log2SbSize ] [ lastSubBlock ][ 0 ] | |
| yS = | |
| DiagScanOrder[ log2TbWidth − log2SbSize ][ log2TbHeight −log2SbSize ] [ lastSubBlock ][ 1 ] | |
| xC = ( xS << log2SbSize ) + | |
| DiagScanOrder[ log2SbSize ][ log2SbSize ][ lastScanPos ][ 0 ] | |
| yC = ( yS << log2SbSize ) + | |
| DiagScanOrder[ log2SbSize ][ log2SbSize ][ lastScanPos ][ 1 ] | |
| } while( ( xC != LastSignificantCoeffX ) \|\| ( yC != LastSignificantCoeffY ) ) | |
| numSigCoeff = 0 | |
| QState = 0 | |
| for( i = lastSubBlock; i >= 0; i− − ) { | |
| startQStateSb = QState | |
| xS = | |
| DiagScanOrder[ log2TbWidth − log2SbSize ][ log2TbHeight −log2SbSize ] [ lastSubBlock ][ 0 ] | |
| yS = | |
| DiagScanOrder[ log2TbWidth − log2SbSize ][ log2TbHeight −log2SbSize ] [ lastSubBlock ][ 1 ] | |
| inferSbDcSigCoeffFlag = 0 | |
| if( ( i < lastSubBlock ) && ( i > 0 ) ) { | |
| coded_sub_block_flag[ xS ][ yS ] | ae(v) |
| inferSbDcSigCoeffFlag = 1 | |
| } | |
| firstSigScanPosSb = numSbCoeff | |
| lastSigScanPosSb = −1 | |
| remBinsPass1 = ( log2SbSize < 2 ? 6 : 28 ) | |
| remBinsPass2 = ( log2SbSize < 2 ? 2 : 4 ) | |
| firstPosMode0 = ( i = = lastSubBlock ? lastScanPos − 1 : numSbCoeff −1 ) | |
| firstPosMode1 = −1 | |
| firstPosMode2 = −1 | |
| for( n = ( i = = firstPosMode0; n >= 0 && remBinsPass1 >= 3; n− − ) { | |
| xC = ( xS << log2SbSize ) + | |
| DiagScanOrder[ log2SbSize ][ log2SbSize ][ n ][ 0 ] | |
| yC = ( yS << log2SbSize ) + | |
| DiagScanOrder[ log2SbSize ][ log2SbSize ][ n ][ 1 ] | |
| if( coded_sub_block_flag[ xS ][ yS ] && ( n > 0 \|\| !inferSbDcSigCoeffFlag ) ) { | |
| sig_coeff_flag[ xC ][ yC ] | ae(v) |
| remBinsPass1− − | |
| if( sig_coeff_flag[ xC ][ yC ] ) | |

TABLE 12-continued

| | Descriptor |
|---|---|
| inferSbDcSigCoeffFlag = 0 <br> } <br> if( sig_coeff_flag[ xC ][ yC ] ) { <br> numSigCoeff++ <br> abs_level_gt1_flag[ n ] <br> remBinsPass1- - <br> if( abs_level_gt1_flag[ n ] ) { <br> par_level_flag[ n ] <br> remBinsPass1- - <br> if( remBinsPass2 > 0 ) { <br> remBinsPass2- - <br> if( remBinsPass2 = = 0 ) <br> firstPosMode1 = n − 1 <br> } <br> } <br> if( lastSigScanPosSb = = −1 ) <br> lastSigScanPosSb = n <br> firstSigScanPosSb = n <br> } <br> AbsLevelPass1[ xC ][ yC ] = sig_coeff_ flag[ xC ][ yC ] + par_level_flag[ n ] + abs_level_gt1_flag[ n ] <br> if( dep_quant_enabled_flag ) <br> QState = QStateTransTable[ QState ][ AbsLevelPass1[ xC ][ yC ] & 1 ] <br> if( remBinsPass1 < 3 ) <br> firstPosMode2 = n − 1 <br> } <br> if( firstPosMode1 < firstPosMode2 ) <br> firstPosMode1 = firstPosMode2 <br> for( n = numSbCoeff − 1; n >= firstPosMode2; n-- ) <br> if( abs_level_gt1_flag[ n ] ) <br> abs_level_gt3_flag[ n ] <br> for( n = numSbCoeff − 1; n >= firstPosMode1; n-- ) { <br> xC = ( xS << log2SbSize ) + DiagScanOrder[ log2SbSize ][ log2SbSize ][ n ][ 0 ] <br> yC = ( yS << log2SbSize ) + DiagScanOrder[ log2SbSize ][ log2SbSize ][ n ][ 1 ] <br> if( abs_level_gt3_flag[ n ] ) <br> abs_remainder[ n ] <br> AbsLevel[ xC ][ yC ] = AbsLevelPass1[ xC ][ yC ] + 2 * ( abs _level_gt3_flag[ n ] + abs_remainder[ n ] ) <br> } <br> for( n = firstPosMode1; n > firstPosMode2; n- - ) { <br> xC = ( xS << log2SbSize ) + DiagScanOrder[ log2SbSize ][ log2SbSize ][ n ][ 0 ] <br> yC = ( yS << log2SbSize ) + DiagScanOrder[ log2SbSize ][ log2SbSize ][ n ][ 1 ] <br> if( abs_level_gt1_flag[ n ] ) <br> abs_remainder[ n ] <br> AbsLevel[ xC ][ yC ] = AbsLevelPass1[ xC ][ yC ] + 2 * abs_remainder[ n ] <br> } <br> for( n = firstPosMode2; n >= 0; n- - ) { <br> xC = ( xS << log2SbSize ) + DiagScanOrder[ log2SbSize ][ log2SbSize ][ n ][ 0 ] <br> yC = ( yS << log2SbSize ) + DiagScanOrder[ log2SbSize ][ log2SbSize ][ n ][ 1 ] <br> dec_abs_level[ n ] <br> if(AbsLevel[ xC ][ yC ] > 0 ) <br> firstSigScanPosSb = n <br> if( dep_quant_enabled_flag ) <br> QState = QStateTransTable[ QState ][ AbsLevel[ xC ][ yC ] & 1 ] <br> } <br> if( dep_quant_enabled_flag | | !sign_data_hiding_enabled_flag ) <br> signHidden = 0 <br> else <br> signHidden = ( lastSigScanPosSb − firstSigScanPosSb > 3 ? 1 : 0 ) <br> for( n = numSbCoeff − 1; n >= 0; n-- ) { <br> xC = ( xS << log2SbSize ) + DiagScanOrder[ log2SbSize ][ log2SbSize ][ n ][ 0 ] <br> yC = ( yS << log2SbSize ) + DiagScanOrder[ log2SbSize ][ log2SbSize )[ n ][ 1 ] <br> if( sig_coeff_flag[ xC ][ yC } && ( !signHidden | | ( n != firstSigScanPosSb ) ) ) <br> coeff_sign_flag[ n ] <br> } <br> if( dep_quant_enabled_flag ) { <br> QState = startQStateSb | <br><br><br><br><br> ae(v) <br><br><br> ae(v) <br><br><br><br><br><br><br><br><br><br><br><br><br><br><br><br><br><br><br><br><br> ae(v) <br><br><br><br><br><br><br><br> ae(v) <br><br><br><br><br><br><br><br><br><br><br><br><br> ae(v) <br><br><br><br><br><br><br><br><br><br><br><br><br><br><br><br><br><br><br><br> ae(v) |

TABLE 12-continued

| | Descriptor |
|---|---|
| ```
for( n = numSbCoeff - 1; n >= 0; n-- ) {
  xC = ( xS << log2SbSize ) +
    DiagScanOrder[ log2SbSize ][ log2SbSize ][ n ][ 0 ]
  yC = ( yS << log2SbSize ) +
    DiagScanOrder[ log2SbSize ][ log2SbSize ][ n ][ 1 ]
  if( sig_coeff_flag[ xC ][ yC ] )
    TransCoeffLevel[ x0 ][ y0 ][ cIdx ][ xC ][ yC ] = ( 2 *
      AbsLevel[ xC ][ yC ] - ( QState > 1 1 : 0 ) ) * ( 1 - 2 *
      coeff_sign_flag[ n ] )
    QState = QStateTransTable[ QState ][ par_level_flag[ n ] ]
} else {
  sumAbsLevel = 0
  for( n = numSbCoeff - 1; n >= 0; n--) {
    xC = ( xS << log2SbSize ) +
      DiagScanOrder[ log2SbSize ][ log2SbSize ][ n ][ 0 ]
    yC = ( yS << log2SbSize ) +
      DiagScanOrder[ log2SbSize ][ log2SbSize ][ n ][ 1 ]
    if( sig_coeff_flag[ xC ][ yC ] ) {
      TransCoeffLevel[ x0 ][ y0 ][ cIdx ][ xC ][ yC ] =
        AbsLevel[ xC ][ yC ] * ( 1 - 2 * coeff_sign_flag[ n ] )
      if( signHidden ) {
        sumAbsLevel += AbsLevel[ xC ][ yC ]
        if( ( n == firstSigScanPosSb ) && ( sumAbsLevel % 2 ) == 1 ) )
          TransCoeffLevel[ x0 ][ y0 ][ cIdx ][ xC ][ yC ] =
            -TransCoeffLevel[ x0 ][ y0 ][ cIdx ][ xC ][ yC ]
      }
    }
  }
}
  }
 }
}
if( tu_mts_flag[ x0 ][ y0 ] && ( cIdx == 0 ) )
  mts_idx[ x0 ][ y0 ][ cIdx ]
}
``` | ae(v) | last_sig_coeff_x_prefix specifies the prefix of the column position of the last significant coefficient in scanning order within a transform block. The values of last_sig_coeff_x_prefix shall be in the range of 0 to (Min(log 2TbWidth, 5)<<1)−1, inclusive. last_sig_coeff_y_prefix specifies the prefix of the row position of the last significant coefficient in scanning order within a transform block. The values of last_sig_coeff_y_prefix shall be in the range of 0 to (Min(log 2TbHeight, 5)<<1)−1, inclusive.

Table 13 below shows syntax elements and associated binarizations.

TABLE 13

| Syntax structure | Syntax element | Binarization | |
|---|---|---|---|
| | | Process | Input parameters |
| tile_group_data( ) | end_of_tile_group_flag | FL | cMax = 1 |
| coding_tree_unit( ) | alf_ctb_flag[ ][ ] | FL | cMax = 1 |
| sao( ) | sao_merge_left_flag | FL | cMax = 1 |
| | sao_merge_up_flag | FL | cMax = 1 |
| | sao_type_idx_luma | TR | cMax = 2, cRiceParam = 0 |
| | sao_type_idx_chroma | TR | cMax = 2, cRiceParam = 0 |
| | sao_offset_abs[ ][ ][ ] | TR | cMax = ( 1 << ( Min( bitDepth, 10 ) − 5 ) ) − 1, cRiceParam = 0 |
| | sao_offset_sign[ ][ ][ ] | FL | cMax = 1 |
| | sao_band_position[ ][ ] | FL | cMax = 31 |
| | sao_eo_class_luma | FL | cMax = 3 |
| | sao_eo_class_chroma | FL | cMax = 3 |
| coding_quadtree( ) | qt_split_cu_flag[ ][ ] | FL | cMax = 1 |
| multi_type_tree( ) | mtt_split_cu_flag | FL | cMax = 1 |
| | mtt_split_cu_vertical_flag | FL | cMax = 1 |
| | mtt_split_cu_binary_flag | FL | cMax = 1 |
| coding_unit( ) | cu_skip_flag[ ][ ] | FL | cMax = 1 |
| | pred_mode_flag | FL | cMax = 1 |
| | pcm_flag[ ][ ] | FL | cMax = 1 |
| | intra_luma_ref_idx[ ][ ] | TR | cMax = 2, cRiceParam = 0 |
| | intra_luma_mpm_flag[ ][ ] | FL | cMax = 1 |
| | intra_luma_mpm_idx[ ][ ] | TR | cMax = 5, cRiceParam = 0 |
| | intra_luma_mpm_remainder[ ][ ] | TB | cMax = 60 |
| | intra_chroma_pred_mode[ ][ ] | 9.5.3.7 | — |
| | merge_flag[ ][ ] | FL | cMax = 1 |
| | inter_pred_idc[ x0 ][ y0 ] | 9.5.3.8 | cbWidth, cbHeight |
| | inter_affine_flag[ ][ ] | FL | cMax = 1 |

TABLE 13-continued

| Syntax structure | Syntax element | Binarization | |
|---|---|---|---|
| | | Process | Input parameters |
| | cu_affine_type_flag[ ][ ] | FL | cMax = 1 |
| | ref_idx_l0[ ][ ] | TR | cMax = num_ref_idx_l0_active_minus1, cRiceParam = 0 |
| | mvp_l0_flag[ ][ ] | FL | cMax = 1 |
| | ref_idx_l1[ ][ ] | TR | cMax = num_ref_idx_l1_active_minus1, cRiceParam = 0 |
| | mvp_l1_flag[ ][ ] | FL | cMax = 1 |
| | avmr_flag[ ][ ] | FL | cMax = 1 |
| | amvr_4pel_flag[ ][ ] | FL | cMax = 1 |
| | gbi_idx[ ][ ] | TR | cMax = NoBackwardPredFlag ? 4: 2 |
| | cu_cbf | FL | cMax = 1 |
| | tu_cbf_cr[ ][ ][ ] | FL | cMax = 1 |
| | cu_qp_delta_abs | 9.5.3.9 | — |
| | cu_qp_delta_sign_flag | FL | cMax = 1 |
| | tu_mts_flag[ ][ ] | FL | cMax = 1 |
| residual_coding( ) | transform_skip_flag[ ][ ][ ] | FL | cMax = 1 |
| | last_sig_coeff_x_prefix | TR | cMax = ( Min( log2TbWidth, 5 ) << 1 ) − 1, cRiceParam = 0 |
| | last_sig_coeff_y_prefix | TR | cMax = ( Min( log2TbHeight, 5 ) << 1 ) − 1, cRiceParam = 0 |
| | last_sig_coeff_x_suffix | FL | cMax = ( 1 << ( ( last_sig_coeff_x_prefix >> 1 ) − 1 ) − 1 ) |
| | last_sig_coeff_y_suffix | FL | cMax = ( 1 << ( ( last_sig_coeff_y_prefix >> 1 ) − 1 ) − 1 ) |
| | coded_sub_block_flag[ ][ ] | FL | cMax = 1 |
| | sig_coeff_flag[ ][ ] | FL | cMax = 1 |
| | par_level_flag[ ] | FL | cMax = 1 |
| | abs_level_gt1_flag[ ] | FL | cMax = 1 |
| | abs_level_gt3_flag[ ] | FL | cMax = 1 |
| | abs_remainder[ ] | 9.5.3.10 | cIdx, current sub-block index i, x0, y0 |
| | dec_abs_level[ ] | 9.5.3.11 | cIdx, x0, y0, xC, yC, log2TbWidth, log2TbHeight |
| | coeff_sign_flag[ ] | FL | cMax = 1 |
| | mts_idx[ ][ ][ ] | FL | cMax = 3 |

In the above-described embodiment, the methods are described based on a flowchart by means of a series of steps or blocks, but the present disclosure is not limited to the order of steps, and certain steps may occur in a different order or concurrently with other steps than those described above. Further, it may be understood by a person having ordinary skill in the art that the steps shown in a flowchart are not exclusive, and that another step may be incorporated into the flowchart or one or more steps may be removed from the flowchart without affecting the scope of the present disclosure.

The foregoing methods according to the disclosure may be implemented as a software form, and the encoding apparatus and/or decoding apparatus according to the disclosure may be included in an apparatus for performing image processing of, for example, a TV, a computer, a smartphone, a set-top box, and a display device.

In the disclosure, when embodiments are embodied by a software, the forgoing methods may be embodied with modules (process, function or the like) of performing above-described functions. The modules may be stored in a memory and may be executed by a processor. The memory may be inside or outside the processor and may be connected to the processor via a well-known various means. The processor may include an application-specific integrated circuit (ASIC), a different chipset, a logic circuit, and/or a data processor. The memory may include a read-only memory (ROM), a random access memory (RAM), a flash memory, a memory card, a storage medium, and/or another storage device. That is, embodiments described in the present disclosure may be embodied and performed on a processor, a microprocessor, a controller or a chip. For example, function units shown in each drawing may be embodied and performed on a processor, a microprocessor, a controller or a chip. In this case, information (e.g., information on instruction) or algorithm for embodiment may be stored in a digital storage medium.

Further, the decoding apparatus and the encoding apparatus to which the present disclosure is applied may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an internet streaming service providing device, a three-dimensional (3D) video device, a virtual reality (VR) device, an augmented reality (AR) device, a video telephony video device, a transportation means terminal (e.g., a vehicle (including an autonomous vehicle) terminal, an aircraft terminal, a ship terminal, etc.) and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied may be produced in the form of a program executed by a computer, and be stored in a computer-readable recording medium. Multimedia data having a data structure according to the present disclosure may be also stored in a computer-readable recording medium. The computer-readable recording medium includes all kinds of storage devices and distributed storage devices in which computer-readable data are stored. The computer-readable recording medium may include, for example, a Blu-ray Disc (BD), a Universal Serial Bus (USB), a ROM, a PROM, an EPROM, an EEPROM, a RAM, a CD-ROM, a magnetic tape, a floppy disk and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network.

Additionally, the examples of the present disclosure may be embodied as a computer program product by program codes, which may be performed in a computer by the embodiment of the present disclosure. The program codes may be stored on a computer-readable carrier.

Figure 13:
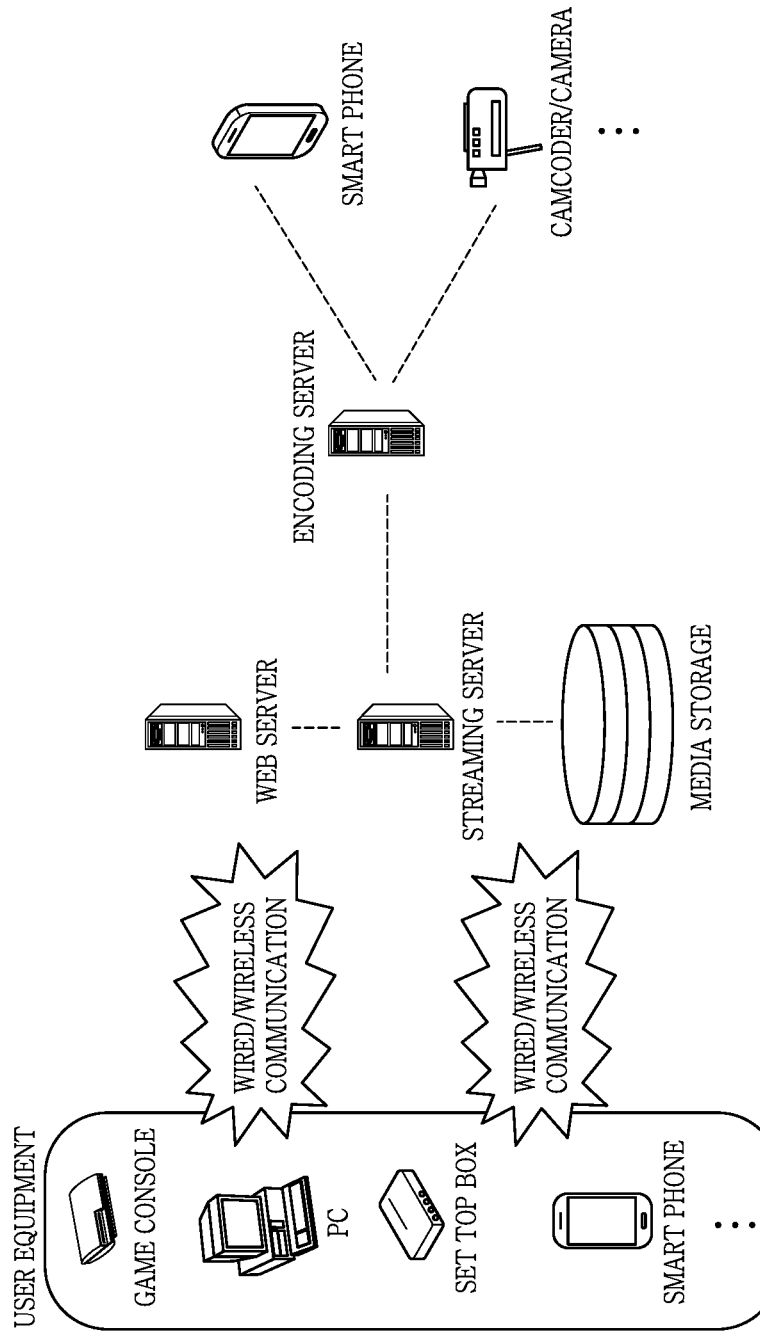
FIG. 13 represents an example of a content streaming system to which the disclosure of the present document may be applied.

FIG. 13 represents an example of a content streaming system to which the disclosure of the present document may be applied.

Referring to FIG. 13, the content streaming system to which the present disclosure is applied may largely include an encoding server, a streaming server, a web server, a media storage, a user device, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the smart phone, the camera, the camcoder or the like directly generates a bitstream, the encoding server may be omitted.

The bitstream may be generated by an encoding method or a bitstream generation method to which the present disclosure is applied. And the streaming server may temporarily store the bitstream in a process of transmitting or receiving the bitstream.

The streaming server transmits multimedia data to the user equipment based on a user's request through the web server, which functions as an instrument that informs a user of what service there is. When the user requests a service which he or she wants, the web server transfers it to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be distributedly processed.

What is claimed is:

1. An image decoding method performed by a decoding apparatus, the method comprising:
receiving a bitstream including residual information;
deriving transform coefficients for a current block based on the residual information;
deriving residual samples for the current block from the transform coefficients based on an inverse transform; and
generating a reconstructed picture based on the residual samples for the current block,
wherein the residual information includes a last_sig_coeff_x_prefix syntax element related to an x component of a position of a last significant coefficient of the current block,
wherein based on a width of the current block being equal to 64,
and high frequency zeroing being applied to the current block such that the current block includes a high frequency zeroing out region and a low frequency transform coefficient region, the low frequency transform coefficient region including at least one significant transform coefficient and the high frequency zeroing out region is a region outside of the low frequency transform coefficient region in the current block, a maximum length of a codeword for the last_sig_coeff_x_prefix syntax element is determined as 9 for a width of a block being equal to 64 based on a determination that a width of the low frequency coefficient region is set to 32, and
wherein the last_sig_coeff_x_prefix syntax element is based on truncated rice binarization based on the width of the low frequency transform coefficient region being 32.

2. The image decoding method of claim 1, wherein the residual information includes coded subblock flag representing whether all transform coefficient levels of transform coefficients for a subblock in the current block are equal to 0, and
the coded subblock flag is for the subblock located in the low frequency transform coefficient region.

3. The image decoding method of claim 1, wherein transform coefficient subblock scanning is applied to subblocks located in the low frequency transform coefficient region.

4. The image decoding method of claim 1, wherein based on the current block of which width is 64,
for x component of the position of the last significant coefficient with a value of one of 24 through 31, the codeword for the last_sig_coeff_x_prefix syntax element is "111111111".

5. An image encoding method by an encoding apparatus, the method comprising:
deriving residual samples for a current block;
deriving transform coefficients for the current block based on the residual samples for the current block;
encoding residual information related with the transform coefficients,
wherein the residual information includes a last sig coeff x prefix syntax element related to an x component of a position of a last significant coefficient of the current block,
wherein based on a width of the current block being equal to 64,
and high frequency zeroing being applied to the current block such that the current block includes a high frequency zeroing out region and a low frequency transform coefficient region, the low frequency transform coefficient region including at least one significant transform coefficient and the high frequency zeroing out region is a region outside of the low frequency transform coefficient region in the current block, a maximum length of a codeword for the last_sig_coeff_x_prefix syntax element is determined as 9 for a width of a block being equal to 64 based on a determination that a width of the low frequency coefficient region is set to 32, and wherein the last_sig_coeff_x_prefix syntax element is based on truncated rice binarization based on the width of the low frequency transform coefficient region being 32.

6. The image encoding method of claim 5, wherein the residual information includes coded subblock flag representing whether all transform coefficient levels of transform coefficients for a subblock in the current block are equal to 0, and the coded subblock flag is for the subblock located in the low frequency transform coefficient region.

7. The image encoding method of claim 5, wherein transform coefficient subblock scanning is applied to subblocks located in the lowfrequency transform coefficient region.

8. The image encoding method of claim 5, wherein based on the current block of which width is 64, for x component of the position of the last significant coefficient with a value of one of 24 through 31, the codeword for the last_sig_coeff_x_prefix syntax element is "111111111".

9. A non-transitory computer readable storage medium storing a bitstream of image information generated by a method, the method comprising:

deriving residual samples for a current block;

deriving transform coefficients for a current block based on the residual samples for the current block; and encoding the image information including residual information related with the transform coefficients to output the bitstream, wherein the residual information includes a last_sig_coeff_x_prefix syntax element related to an x component of a position of a last significant coefficient of the current block, wherein based on a width of the current block being equal to 64, and high frequency zeroing being applied to the current block such that the current block includes a high frequency zeroing out region and a low frequency transform coefficient region, the low frequency transform coefficient region including at least one significant transform coefficient and the high frequency zeroing out region is a region outside of the low frequency transform coefficient region in the current block, a maximum length of a codeword for the last_sig_coeff_x_prefix syntax element is determined as 9 for a width of a block being equal to 64 based on a determination that a width of the low frequency coefficient region is set to 32, and wherein the last_sig_coeff_x_prefix syntax element is based on truncated rice binarization based on the width of the low frequency transform coefficient region being 32.

10. The non-transitory computer readable storage medium of claim 9, wherein based on the current block of which width is 64, for x component of the position of the last significant coefficient with a value of one of 24 through 31, the codeword for the last_sig_coeff_x_prefix syntax element is "111111111".

* * * * *